(12) United States Patent
Anderson

(10) Patent No.: US 7,911,202 B2
(45) Date of Patent: Mar. 22, 2011

(54) ELECTROMAGNETIC TRACKING METHOD AND SYSTEM

(75) Inventor: Peter Traneus Anderson, Andover, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/849,532

(22) Filed: Aug. 3, 2010

(65) Prior Publication Data

US 2010/0301841 A1   Dec. 2, 2010

Related U.S. Application Data

(62) Division of application No. 11/702,355, filed on Feb. 5, 2007, now Pat. No. 7,782,046.

(51) Int. Cl.
*G01B 7/14* (2006.01)
*G01R 33/02* (2006.01)

(52) U.S. Cl. .................. 324/207.15; 324/258; 336/225

(58) Field of Classification Search .............. 336/65, 336/225, 230–232; 242/421.1; 343/895; 324/207.15–207.17, 258, 261; 600/13
See application file for complete search history.

(56) References Cited

U.S. PATENT DOCUMENTS

| | | |
|---|---|---|
| 1,450,080 A | 3/1923 | Hazeltine |
| 4,710,708 A | 12/1987 | Rorden |
| 4,849,692 A | 7/1989 | Blood |
| 4,945,305 A | 7/1990 | Blood |
| 5,425,382 A | 6/1995 | Golden |
| 5,453,686 A | 9/1995 | Anderson |
| 5,558,091 A | 9/1996 | Acker |
| 5,592,939 A | 1/1997 | Martinelli |
| 5,640,170 A | 6/1997 | Anderson |
| 5,676,673 A | 10/1997 | Ferre |
| 5,747,996 A | 5/1998 | Fuchs |
| 5,782,765 A | 7/1998 | Jonkman |
| 5,800,352 A | 9/1998 | Ferre |
| 5,803,089 A | 9/1998 | Ferre |
| 5,829,444 A | 11/1998 | Ferre |
| 5,873,822 A | 2/1999 | Ferre |
| 5,913,820 A | 6/1999 | Bladen |
| 5,967,980 A | 10/1999 | Ferre |

(Continued)

FOREIGN PATENT DOCUMENTS

WO   WO 9739312 A1 * 10/1997

OTHER PUBLICATIONS

Nara, et al.; "A Closed-Form Formula for Magnetic Dipole Localization by Measurement of Its Magnetic Field and Spatial Gradients"; Digital Object Identifier; 2006 IEEE; pp. 3291-3293.

*Primary Examiner* — Bot L LeDynh
(74) *Attorney, Agent, or Firm* — Fletcher Yoder P.C.

(57) ABSTRACT

Provided is an electromagnetic coil arrangement comprising a set of electromagnetic sensors at fixed locations with respect to each other, each of the electromagnetic sensors comprising a planar coil coupled to a conductive layer, the planar coil comprising non-concentric rings. Further, provided is an electromagnetic tracking system, comprising an electromagnetic coil arrangement, at least one complementary electromagnetic sensor and a processor configured to process a signal comprising data indicative of a mutual inductance between the at least one complementary electromagnetic sensor and each of the set of the electromagnetic sensors of the electromagnetic coil arrangement. Also, provided are a method of tracking and a method of manufacturing an electromagnetic coil arrangement.

10 Claims, 18 Drawing Sheets

U.S. PATENT DOCUMENTS

| | | |
|---|---|---|
| 6,052,610 A | 4/2000 | Koch |
| 6,073,043 A | 6/2000 | Schneider |
| 6,129,668 A | 10/2000 | Haynor |
| 6,172,499 B1 | 1/2001 | Ashe |
| 6,175,756 B1 | 1/2001 | Ferre |
| 6,201,387 B1 | 3/2001 | Govari |
| 6,226,547 B1 | 5/2001 | Lockhart |
| 6,246,231 B1 | 6/2001 | Ashe |
| 6,374,134 B1 | 4/2002 | Bladen |
| 6,445,943 B1 | 9/2002 | Ferre |
| 6,502,031 B2 | 12/2002 | Uehara |
| 6,539,327 B1 | 3/2003 | Dassot |
| 6,701,179 B1 | 3/2004 | Martinelli |
| 6,774,624 B2 | 8/2004 | Anderson |
| 6,862,004 B2 | 3/2005 | Alexopoulos et al. |
| 6,980,921 B2 | 12/2005 | Anderson |
| 7,015,859 B2 | 3/2006 | Anderson |
| 7,096,148 B2 | 8/2006 | Anderson |
| 7,158,754 B2 | 1/2007 | Anderson |
| 7,508,195 B2 * | 3/2009 | Anderson ............... 324/207.16 |
| 7,573,258 B2 | 8/2009 | Anderson |
| 2001/0045826 A1 | 11/2001 | Schneider |
| 2005/0235482 A1 | 10/2005 | Deaett et al. |
| 2006/0058604 A1 | 3/2006 | Avinash |
| 2006/0106292 A1 | 5/2006 | Anderson |
| 2006/0247511 A1 | 11/2006 | Anderson |

* cited by examiner

ELECTROMAGNETIC TRACKING METHOD AND SYSTEM

CROSS-REFERENCE TO RELATED APPLICATIONS

This application is a divisional of U.S. application Ser. No. 11/702,355, filed Feb. 5, 2007, which is incorporated by reference herein.

BACKGROUND

This disclosure relates generally to tracking systems that use magnetic fields to determine positions and orientations of an object, such as systems used for tracking instruments and devices during surgical interventions and other medical procedures. More particularly, the present disclosure relates to a system and method to more accurately determine position and orientation of an object.

Tracking systems have been used in various industries and applications to provide position information relating to objects. For example, electromagnetic tracking may be useful in aviation applications, motion sensing applications, and medical applications. In medical applications, tracking systems have been used to provide an operator (e.g., a physician) with information to assist in the precise and rapid positioning of a medical device located in or near a patient's body. In general, an image may be displayed on a monitor to provide positioning information to an operator. The image may include a visualization of the patient's anatomy with an icon on the image representing the device. As the device is positioned with respect to the patient's body, the displayed image is updated to reflect the correct device coordinates. The base image of the patient's anatomy may be generated either prior to, or during, the medical procedure. For example, any suitable medical imaging technique, such as X-ray, computed tomography (CT), magnetic resonance imaging (MRI), positron emission tomography (PET), and ultrasound, may be utilized to provide the base image displayed during tracking. The combination of the base image and the representation of the tracked device provides positioning information that allows a medical practitioner to manipulate a device to a desired position and/or associate information gathered to a precise location.

To determine device location, tracking systems may utilize a method of electromagnetic (EM) field generation and detection. Using this method, at least one magnetic field is generated from one or more EM sensors, and the magnetic fields are detected by one or more complementary EM sensors. In such a system the mutual inductance of the EM field detected may be processed to resolve a position and/or orientation of the EM sensors relative to one another. For example, an EM sensor may be fixed in a known position, with a complementary EM sensor mounted at the operative end of a device. While the EM sensor generates a magnetic field, the magnetic field characteristics may be detected by the complementary EM sensor. The detected characteristics may be processed to determine the position and orientation (e.g., the X, Y and Z coordinates, as well as the roll, pitch and yaw angles) of the EM sensors relative to one another.

However, as will be appreciated, the presence of field distorting objects in or near the magnetic field may cause distortions of the magnetic field emitted from the EM sensors. As a result, the magnitude and direction of the magnetic field sensed by the complementary EM sensor may be inaccurate. Distortions, such as these, may come from a multitude of sources, including: signals from other electromagnetic sources, the magnetic fields generated by eddy currents in another conductive object, and the field distorting effect of a ferro-magnetic objects. Unless compensated for, or significantly reduced, these distortions and inaccuracies may produce an error in the determined location of the device. For example, a source of magnetic field distortion may include the equipment surrounding the tracking system (e.g., a metal surgery table or conductive medical devices). In these instances, the electromagnetic field generated by the EM sensors may induce eddy currents into a metal surface. The eddy currents may produce additional electromagnetic fields that distort the electromagnetic field originally generated by the EM sensor, thereby creating errors in the determined position and orientation of the complementary EM sensor. Although, methods are known to map and compensate for the distortions, if the distortions become too significant, mapping may not be capable of compensating for the distortions.

Accordingly, there is a desire to provide an electromagnetic field tracking system, wherein EM sensors are configured to limit the impact of magnetic field distortions and provide for accurate determinations of position and/or orientation of a device.

BRIEF DESCRIPTION

In accordance with one aspect, provided is an electromagnetic coil arrangement comprising a set of electromagnetic sensors at fixed locations with respect to each other, each of the electromagnetic sensors comprising a planar coil coupled to a conductive layer, the planar coil comprising non-concentric rings.

In accordance with another aspect, provided is an electromagnetic tracking system, comprising an electromagnetic coil arrangement, the electromagnetic coil arrangement comprising a set of electromagnetic sensors at fixed locations with respect to each other, each of the electromagnetic sensors comprising a planar coil coupled to a conductive layer, the planar coil comprising non-concentric rings, at least one complementary electromagnetic sensor and a processor configured to process a signal comprising data indicative of a mutual inductance between the at least one complementary electromagnetic sensor and each of the set of the electromagnetic sensors of the electromagnetic coil arrangement.

In accordance with yet another aspect, provided is a method of electromagnetic tracking, comprising positioning at least one complementary electromagnetic sensor in a volume of interest with respect to a coil arrangement adjacent to the volume of interest, the coil arrangement comprising a set of electromagnetic sensors at fixed locations with respect to each other, each of the electromagnetic sensors comprising a substrate, a conductive layer coupled to the substrate, and a planar coil coupled to the substrate on an opposite side of the substrate from the conductive layer, the planar coil comprising non-concentric rings, and sensing a magnetic field characteristic of a magnetic field generated by either the at least one complementary electromagnetic sensor or at least one of the set of electromagnetic sensors.

In accordance with yet another aspect of the present technique, provided is a method of manufacturing an electromagnetic coil arrangement comprising coupling a plurality of planar coils to a conductive layer, wherein each of the plurality of planar coils comprises non-concentric rings, wherein each of the planar coils is configured such that a drive current applied across the non-concentric rings of the respective planar coil provides a magnetic field, the magnetic field comprising a moment vector that is tilted at an angle from the normal to the respective planar coil.

DRAWINGS

These and other features, aspects, and advantages will become better understood when the following detailed description is read with reference to the accompanying drawings in which like characters represent like parts throughout the drawings, wherein.

DETAILED DESCRIPTION

Figure 1:
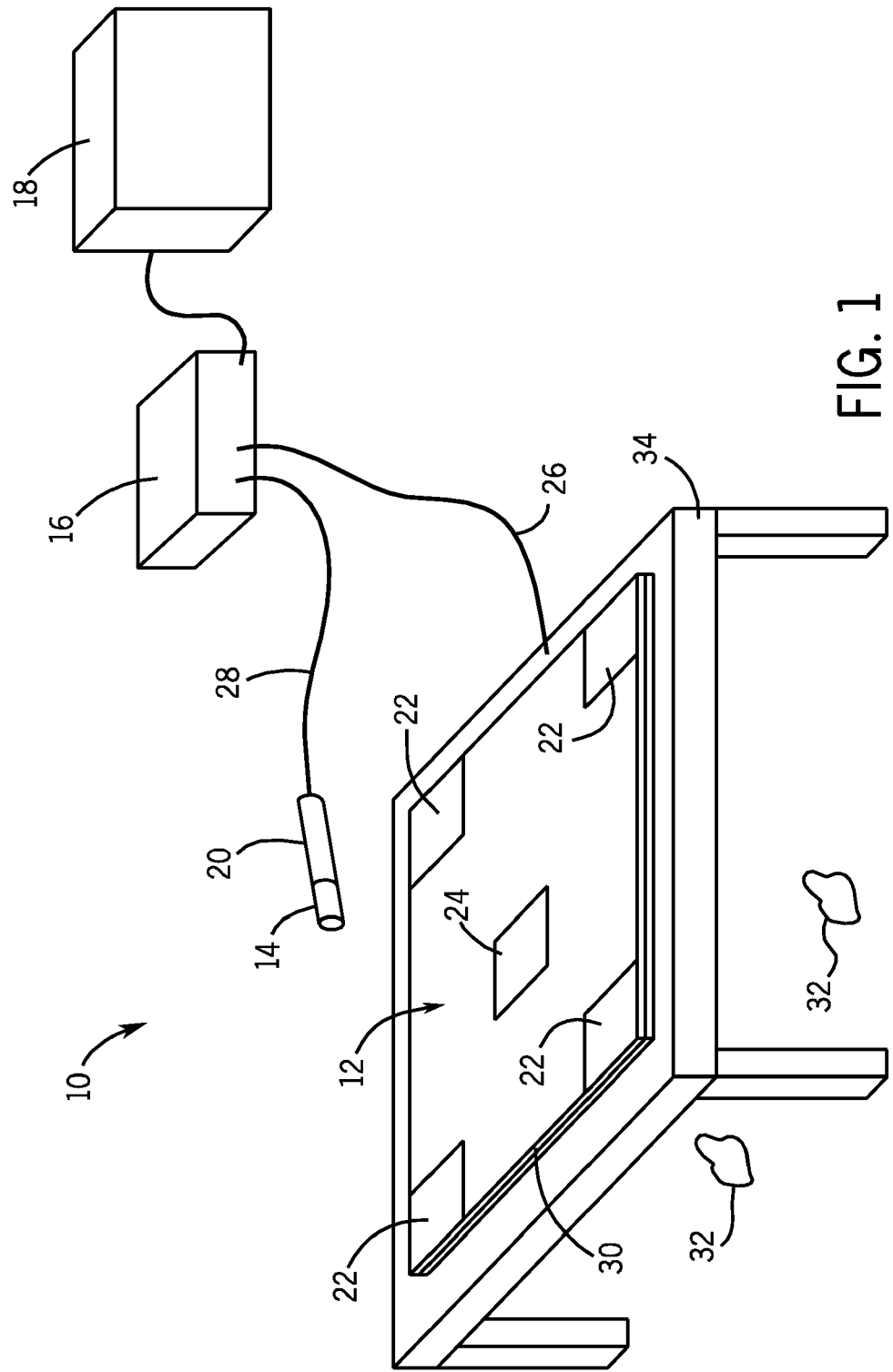
FIG. 1 is an illustration of an exemplary system for magnetic field tracking implementing certain aspects of the present technique.

Referring now to FIG. 1, a tracking system 10 in accordance with one embodiment of the present technique is illustrated. The tracking system 10 may generally include multiple tracking components. As depicted, the tracking components may include an electromagnetic (EM) coil arrangement 12, at least one complementary EM sensor 14, a processor 16 and a user interface 18. The at least one complementary EM sensor 14 may be coupled to at least one instrument 20.

In the illustrated embodiment, the EM coil arrangement 12 comprises a plurality of EM sensors 22 and at least one center EM sensor 24. Generally, the EM sensors 22 and at least one center EM sensor 24 may be formed from magnetic dipoles (e.g., coils, current loops, or electromagnets) capable of producing a dipole magnetic field when a current is applied across them. In some embodiments, the EM sensors (such as the plurality of EM sensors 22 and the at least one center EM sensor 24) may employ industry-standard coil architecture (ISCA), dipole coils, planar coils, or a combination of the three. ISCA is defined as three approximately collocated, approximately orthogonal, and approximately dipole coils. EM sensors that are configured with a single coil may generate a single dipole magnetic field, while EM sensors configured with multiple coils may be capable of providing multiple dipole magnetic fields of varying magnitude and direction. By way of example, the EM sensors may be implemented wherein each of the EM sensors includes three orthogonal magnetic dipoles and thus generates a dipole magnetic field in three planes (i.e., X, Y and Z planes).

The magnetic field generated by each of the EM sensors (such as the plurality of EM sensors 22 and the at least one center EM sensor 24) may be dependent upon a current that is provided across the coil of the respective sensor. In one embodiment, to provide a current across the coil, the processor 16 may provide a drive current to each of the EM sensors 22 and 24, via cable 26, as illustrated in FIG. 1. As will be appreciated, the EM sensors 22 and 24 may also operate in a wireless configuration that does not require a cabled connection between the EM sensors 22 and 24 and the processor 16. With the current flowing across the coil of the EM sensor, the EM sensor may generate at least one dipole magnetic field with a given magnitude and direction. Characteristics of the magnetic field (e.g., magnitude, direction, phase or frequency) may be varied by manipulating the current.

In the depicted system 10, the at least one complementary EM sensor 14 may be configured to sense the magnetic field generated by each of the EM sensors 22 and 24 of the EM coil arrangement 12. For example, sensing the magnetic field may include the at least one complementary EM sensor 14 sensing the mutual inductance of the magnetic field. Embodiments of the at least one complementary EM sensor 14 may include an ISCA, a single dipole coil, a planar coil, or a combination of the three. The coils of the at least one complementary EM sensor 14 provide for sensing of the magnetic field data by the at least one complementary EM sensor 14. As will be appreciated, the mutual inductance of EM sensors 22 and 24 of the EM coil arrangement 12 and at least one complementary EM sensor 14 are the same, regardless as to which sensors generate the EM field. Therefore, positioning and functionality of the at least one complementary EM sensor 14 with respect to the EM sensors 22 and the at least one center EM sensor 24 in the system 10 may be reversed. For example, in one embodiment, the at least one complementary EM sensor 14 may generate the EM field, while the EM sensors 22 and the at least one center EM sensor 24 are configured to sense the magnetic field. For simplicity, the remainder of this paper may refer to the EM sensors 22 and the at least one center EM sensor 24 as generating a magnetic field, while the at least one complementary EM sensor 14 may be configured to sense the magnetic field.

In either of these configurations, the data gathered by the at least one complementary EM sensor 14 may be processed to determine various parameters. For example, in the illustrated embodiment of FIG. 1, the magnetic field sensed from the at least one complementary EM sensor 14 may be output to a processor 16, via a cable 28. As will be appreciated, the at least one complementary EM sensor 14 may also operate in a wireless configuration that does not require a cable connection between the at least one complementary EM sensor 14 and processor 16. In another embodiment, the processor 16 may monitor the magnetic field sensed by the at least one complementary EM sensor 14 to determine a location (e.g., position and/or orientation) of each complementary EM sensor 14 with respect to the EM coil arrangement 12 and/or a work surface 30.

As mentioned previously, the EM sensors (such as the at least one complementary EM sensor 14, the EM sensors 22, and/or the at least one center EM sensor 24) may be configured as having multiple coils. For example, each of the EM sensors 22 and 24 may include three concentric orthogonal dipole coils (coil trios). As will be appreciated, in such an embodiment, a current may be induced across all three coils of the coil trio to simultaneously generate three magnetic fields from a single one of the EM sensors 22 and 24. The magnetic field generated by each respective coil may be distinguished by varying phase and frequency of each magnetic field generated. The at least one complementary EM sensor 14 may then sense each of the three magnetic fields generated, and transmit the data received to the processor 16. The processor 16 may identify each of the magnetic fields by their respective phase and frequency. As will be appreciated, depending on the number of magnetic fields generated and received, multiple degrees of freedom may be resolved by the processor 16. For example, wherein an EM sensor 22 and the at least one complementary EM sensor 14 each include a coil trio, six degrees of freedom, including three position values and three orientation values may be determined (i.e., X, Y, Z and roll, pitch, yaw).

As illustrated by FIG. 1, the at least one complementary EM sensor 14 may be coupled to the at least one instrument 20. In medical tracking applications, the at least one instrument 20 may include devices used during a medical procedure. As will be appreciated by a person of ordinary skill in the art, the present technique may be used to track a variety of instruments 20 and devices used during medical procedures. For example, the at least one instrument 20 may be a drill, a guide wire, a catheter, an endoscope, a laparoscope, a biopsy needle, an ablation device or other medical devices.

In general, the processor 16 may perform several functions in the tracking system 10. For example, the processor 16 may include electronic circuitry to provide the drive signals, electronic circuitry to receive the sensed signals, and electronic circuitry to condition the drive signals and the sensed signals. Further, the processor 16 may include processing to coordinate functions of the system 10, to implement navigation and visualization algorithms suitable for tracking and displaying the position and orientation of an instrument 20 or device on a monitor. The processor 16 may include a digital signal processor, memory, a central processing unit (CPU) or the like, for processing the acquired signals. As will be appreciated, the processing may include the use of one or more computers within the processor 16. The addition of a separate CPU may provide additional functions for tracking, including, but not limited to, signal processing of data received, and transmission of data to the user interface 18, including a display. In one embodiment, the CPU may be confined within the processor 16, while in another embodiment a CPU may include a stand-alone device that is separate from the processor 16.

As previously mentioned, system 10 may also include a user interface 18. For example, the system 10 may include a monitor configured to display the position and orientation of at least one instrument 20 or device. Thus, a medical practitioner may monitor the position of the at least one tracked instrument 20 or device on the user interface 18. As will be appreciated, the user interface 18 may also include additional devices to facilitate the exchange of data between the system 10 and the user. For example, the user interface 18 may include a keyboard, mouse, printers or other peripherals. While the processor 16 and the user interface 18 may be separate devices, in certain embodiments, the processor 16 and the user interface 18 may be provided as a single unit.

Returning now to the processing of the data received, the processor 16 may use an iterative approach to arrive at a determined position and orientation of the at least one instrument 20. For example, an initial "seed" approximation of position and orientation may be provided, or resolved by initial measurements of the system 10 and the processor 16. The processor 16 may then use this approximate position and orientation in subsequent algorithms to predict the electric field characteristics and to determine a new estimate of position. The processor 16 may then consider calculating new estimates of the magnetic field characteristics. The iteration of estimating and comparing may continue until the estimated values are sufficiently similar to the position and orientation actually sensed.

As will be appreciated, in the embodiment depicted in FIG. 1, the magnetic field is susceptible to interference from distorting objects 32 (such as conductive objects) located within the vicinity of the generated magnetic field. For example, if the EM coil arrangement 12 is located on top of a metal surgery table 34, the magnetic field may be susceptible to interference from eddy currents generated on the surface of the metal table 34, and other distorting objects 32 located above and below the plane of the EM coil arrangement 12.

It is desirable for EM sensors to be designed and implemented in such a manner as to eliminate or reduce the distortion caused by distorting objects and to be configured to provide a more accurate measured value for processing. In accordance with some aspects of the present technique, provided is an arrangement of coils that are coupled to a conductive layer. The conductive layer shields the arrangement of planar coils from distorting objects in one direction while allowing the combination of the tilted moment vectors of each coil of the EM coil arrangement 12 to provide three generally orthogonal magnetic fields for use in tracking applications. Further provided are arrangements of EM coils that allows for more accurate tracking near a plane where the EM coil arrangement 12 is located.

Figure 2:
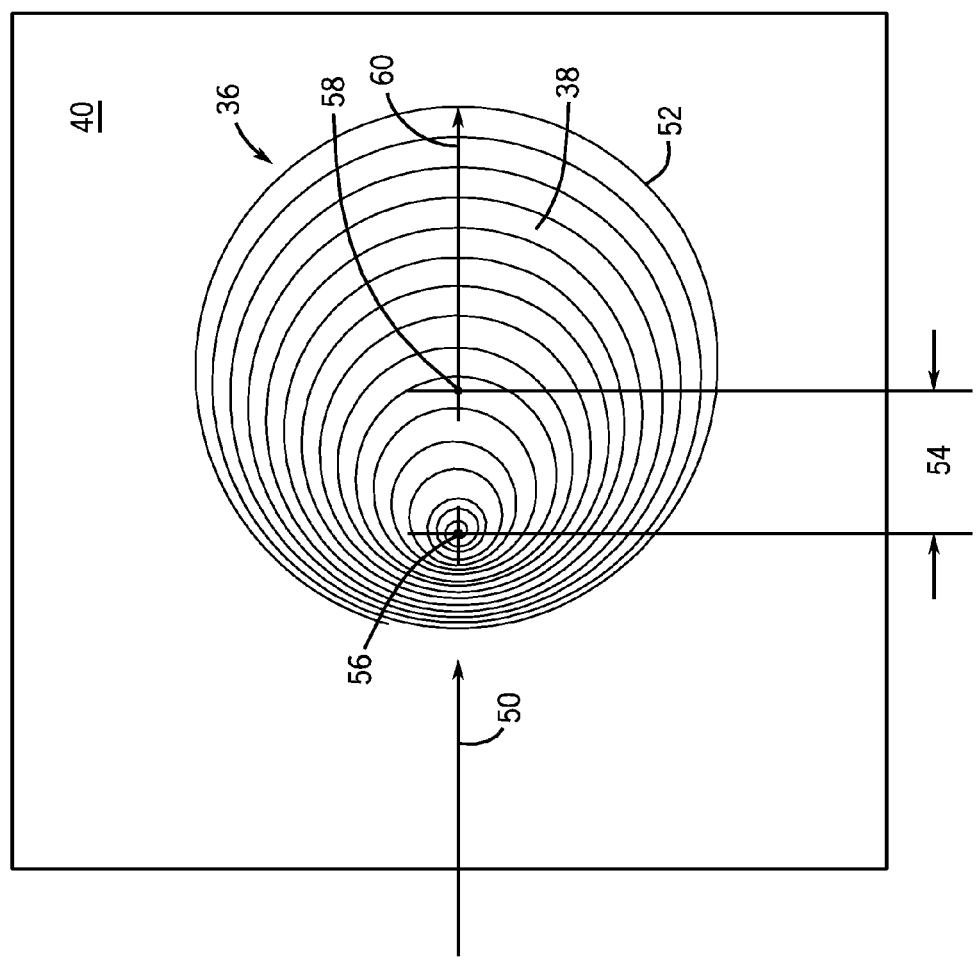
FIG. 2 is an illustration of an exemplary planar coil in accordance with certain aspects of the present technique.
Figure 3:
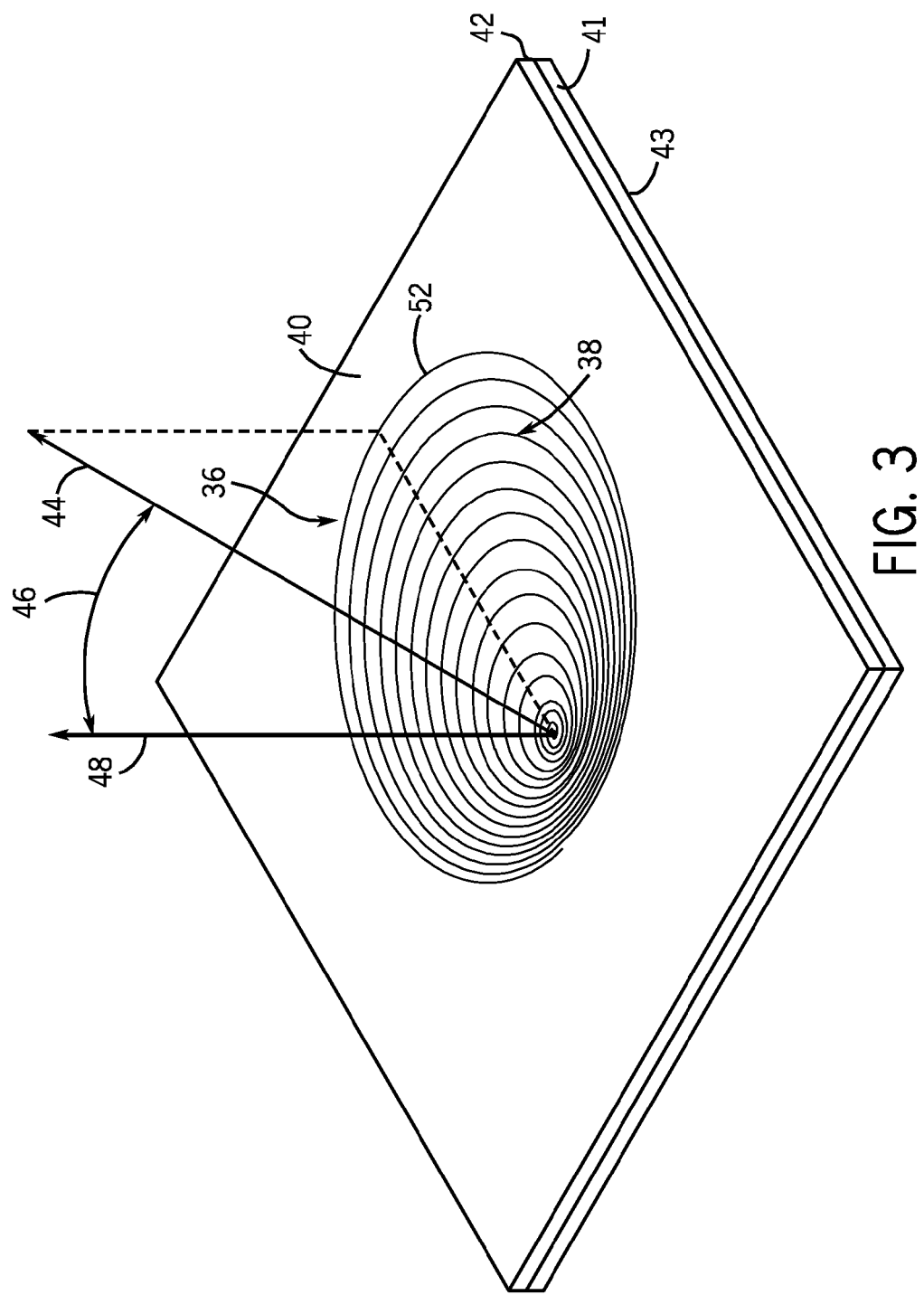
FIG. 3 is an illustration of an exemplary planar coil of FIG. 2 and a tilted dipole moment vector generated by the planar coil in accordance with certain aspects of the present technique.

To properly introduce the reader to the present technique, it may be helpful to first describe the configuration of the planar coils used to form the EM sensors of the EM coil arrangement 12. Turning now to FIGS. 2 and 3, a non-concentric planar coil 36 is depicted in accordance with aspects of the present technique. The embodiment of FIGS. 2 and 3 depict a non-concentric planar coil 36 that includes non-concentric rings 38. Generally, the non-concentric rings 38 may be formed from a conductive material disposed upon a top surface 40 of an insulating layer 42 that is planar in shape. In the illustrated embodiment, for example, the non-concentric planar coil 36 may be formed from at least one copper trace disposed as a spiral approximating a plurality of non-concentric rings 38 on the surface 40 of a printed circuit board (PCB). In one embodiment, the spiral trace forming the non-concentric rings 38 may be approximately 0.005 inches wide and 0.0005 inches thick and 0.005 inches or more apart.

To generate a magnetic field, a current may be induced across the non-concentric rings 38 of the non-concentric planar coil 36. As will be appreciated, the current induced across the non-concentric planar coil 36 may create a dipole magnetic field with a moment vector 44. As depicted in FIGS. 2 and 3, there is a conductive layer 43 and possibly an additional ferromagnetic layer located on a bottom surface 44 of the insulating layer 42 opposite the top surface 40 having the non-concentric planar coil 36 formed thereon. Accordingly, the magnetic field, created by inducing a current across the non-concentric planar coil 36, may not extend below the non-concentric planar coil 36 and the insulating layer 42.

In one embodiment, the non-concentric planar coil 36 may be configured to provide for tilting of the magnetic field moment vector 44 at a tilt angle 46 from the normal vector 48. For example, as illustrated, the non-concentric planar coil 36 may include a single spiral approximating a plurality of non-concentric rings 38. The location of the non-concentric rings 38 of FIGS. 2 and 3 may be derived by shifting each of the non-concentric rings 38, from a concentric position, in a single direction (shown by arrow 50) at a distance proportional to the radius of each respective ring 38. For example, as depicted in FIGS. 2 and 3, the outer ring 52 of non-concentric planar coil 36 may have been shifted at a distance 54 (from origin 56 to the shifted center 58) that is proportional to the radius 60 of the outer ring 52. Similarly, each of the non-concentric rings 38 in the planar coil 36 may be shifted from the origin 56 in the direction 50 at a distance from the origin 56 to a shifted center, wherein the distance is proportional to the radius of each respective ring 38. As will be appreciated by those ordinarily skilled in the art, the shift distance may be affected by several factors, including but not limited to the desired tilt angle 46 (discussed below), the thickness of the non-concentric rings 38, and the original distance between each of the non-concentric rings 38. These considerations may optimize performance and prevent the non-concentric rings 38 from contacting one another, and thereby destroying the conductive path through the entire coil.

As discussed previously, embodiments of the non-concentric planar coil 36 may provide for tilting of the moment vector 44 from the normal vector 48 of the non-concentric planar coil 36. As will be appreciated, where the non-concentric rings 38 of the non-concentric planar coil 36 are positioned as those depicted in FIG. 3, the current density in non-concentric rings 38 may vary inversely with the square of the ring radius 60. In light of this consideration, where the center of each of the non-concentric rings 38 is displaced from the origin 56 by a distance proportional to the radius of each of the non-concentric rings 38, the tilt angle 46 ($\theta$) is derived from:

$$\mathrm{Tan}(\theta) = (\text{shift of ring})/(\text{radius of ring})$$

The "shift of ring" is represented by the distance from the origin 56 to the shifted center 58 of each of the respective non-concentric rings 38. The "radius of ring" corresponds to the respective radius 60 of each of the non-concentric rings 38 in the shift direction 50. For example, the tilt angle 46 for the outer ring 52 may be derived from the arctangent of the distance 54 divided by the radius 60 of the outer ring 52. The tilt angle 46 represents the angle of the moment vector 44 from the normal vector 48 of the non-concentric planar coil 36. In one embodiment, to avoid two non-concentric rings 38 from intersecting as a result of the shifted position, the tilt angle 46 is limited to less than the arctangent of the square root of two, or approximately 45 degrees. This may be derived from a full shift of the ring radius which yields, the "shift of the ring" equal to the "radius of the ring." In this embodiment, the tangent of the tilt angle 46 ($\theta$) is equal to one (i.e., shift of the ring/radius of the ring) and, thus, the tilt angle 46 ($\theta$) is 45 degrees.

Figure 4:
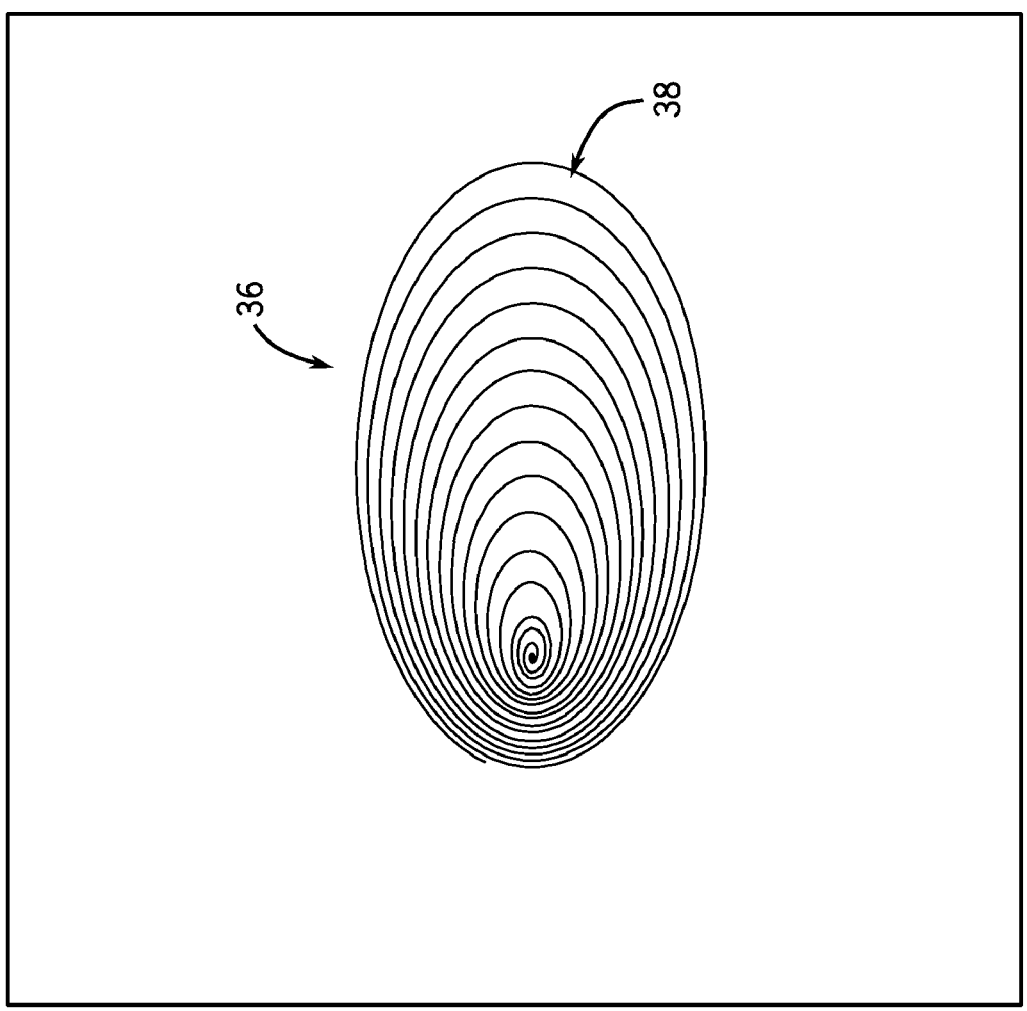
FIG. 4 is an illustration of an alternate embodiment of an exemplary planar coil in accordance with certain aspects of the present technique.

FIGS. 2 and 3 depict an embodiment wherein the planar coil 36 is formed from a spiral approximating non-concentric rings 38 that are generally circular in shape. As will be appreciated by those of ordinary skill in the art, various other shapes may be employed to provide a tilted moment vector 44. For example, as depicted in FIG. 4, the non-concentric rings 38 may take a generally elliptical shape. In addition to a generally elliptical shape, other shapes of non-concentric rings 38 may also be used that provide an appropriate distribution of current density across the non-concentric planar coil 36 to provide a resulting tilted moment vector 44

Figure 5:
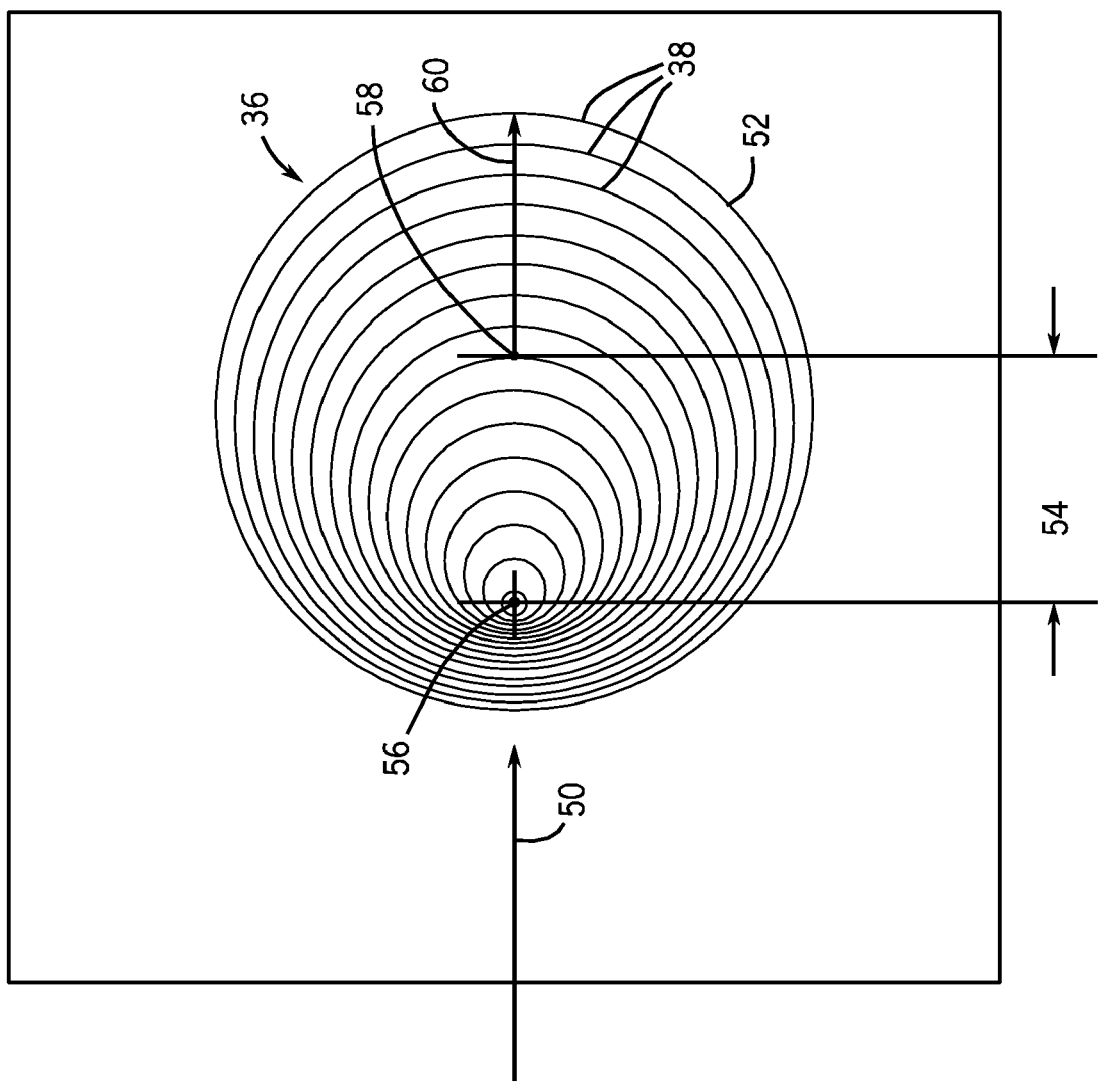
FIG. 5 is an illustration of another alternate embodiment of an exemplary planar coil in accordance with certain aspects of the present technique.

In another embodiment, the non-concentric planar coil 36 may be formed from a plurality of copper traces disposed as a plurality of non-concentric rings 38, for example, on the surface of a PCB. For example, as depicted in FIG. 5, non-concentric planar coil 36 may include multiple non-concentric rings 38 formed about one another. The position and layout of the non-concentric planar coil 36 formed from multiple non-concentric rings 38 may be derived in a similar manner as the embodiment of FIGS. 2 and 3 described above. By way of example, the location of the non-concentric rings 38 of FIG. 5 may be derived by shifting each of the non-concentric rings 38, from a concentric position, in a single direction (shown by arrow 50) at a distance proportional to the radius of each respective non-concentric ring 38. For example, as depicted in FIG. 5, the outer ring 52 of the non-concentric planar coil 36 may have been shifted at a distance 54 (from origin 56 to the shifted center 58) that is proportional to the radius 60 of the outer ring 52. Similarly, each of the non-concentric rings 38 in the non-concentric planar coil 36 may be shifted from the origin 56 in the direction 50 at a distance from the origin 56 to a shifted center, wherein the distance is proportional to the radius of each respective ring 38.

Figure 6:
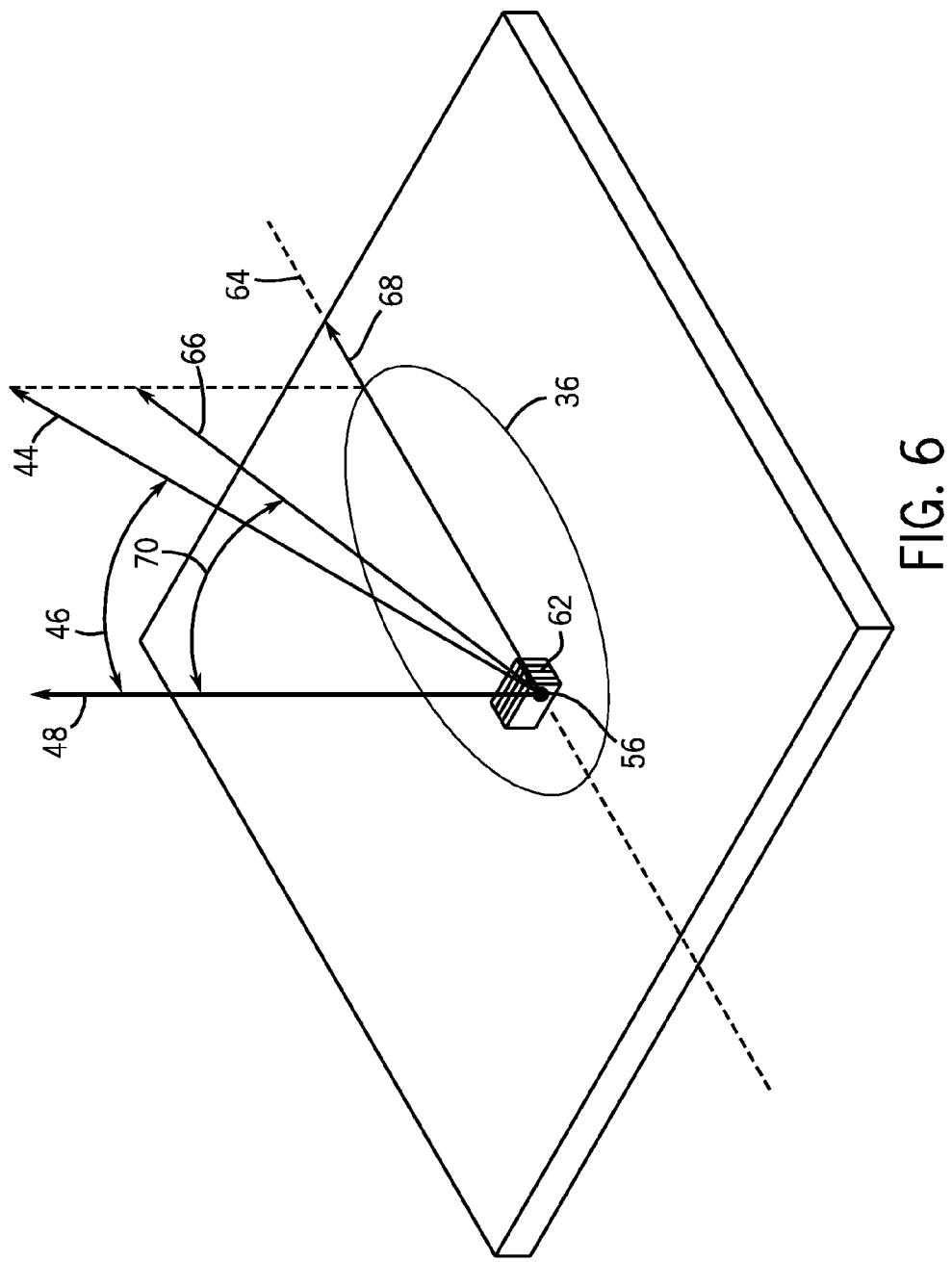
FIG. 6 is an illustration of an exemplary planar coil combined with a standard wire wound coil, and a resulting dipole moment vector in accordance with certain aspects of the present technique.

As mentioned previously, the tilt angle 46 may be limited due to the non-concentric rings 38 intersecting when shifted at a given distance 54. In one embodiment, this may be overcome by the addition of an approximate-dipole coil 62, as depicted in FIG. 6. The approximate-dipole coil 62 may have an axis 64 parallel to the shift direction 50 (see FIG. 2 and FIG. 5). As depicted in FIG. 6, an approximate-dipole coil 62 may be located at or near the origin 56. When the approximately-dipole coil 62 is energized with a drive current in coordination with a drive current to non-concentric planar coil 36, the resulting moment vector 66 may include the vector components of the tilted moment vector 44 and the vector components of the dipole moment vector 68 (i.e., the moment vector 68 produced by the approximate dipole coil 62 along the dipole axis 64). As will be appreciated, the resulting moment vector 66 may have an increased tilt angle 70, as depicted in FIG. 6. The tilt angle 70 may be modified by increasing and decreasing the relative strengths of the tilted moment vector 44 and the dipole moment vector 68. For example, increasing the current through the approximately-dipole coil 62, or increasing the number of rings about the approximately-dipole coil 62 may increase the dipole moment vector 68, and thereby increase the tilt angle 70 of the resulting moment vector 66.

Figure 7:
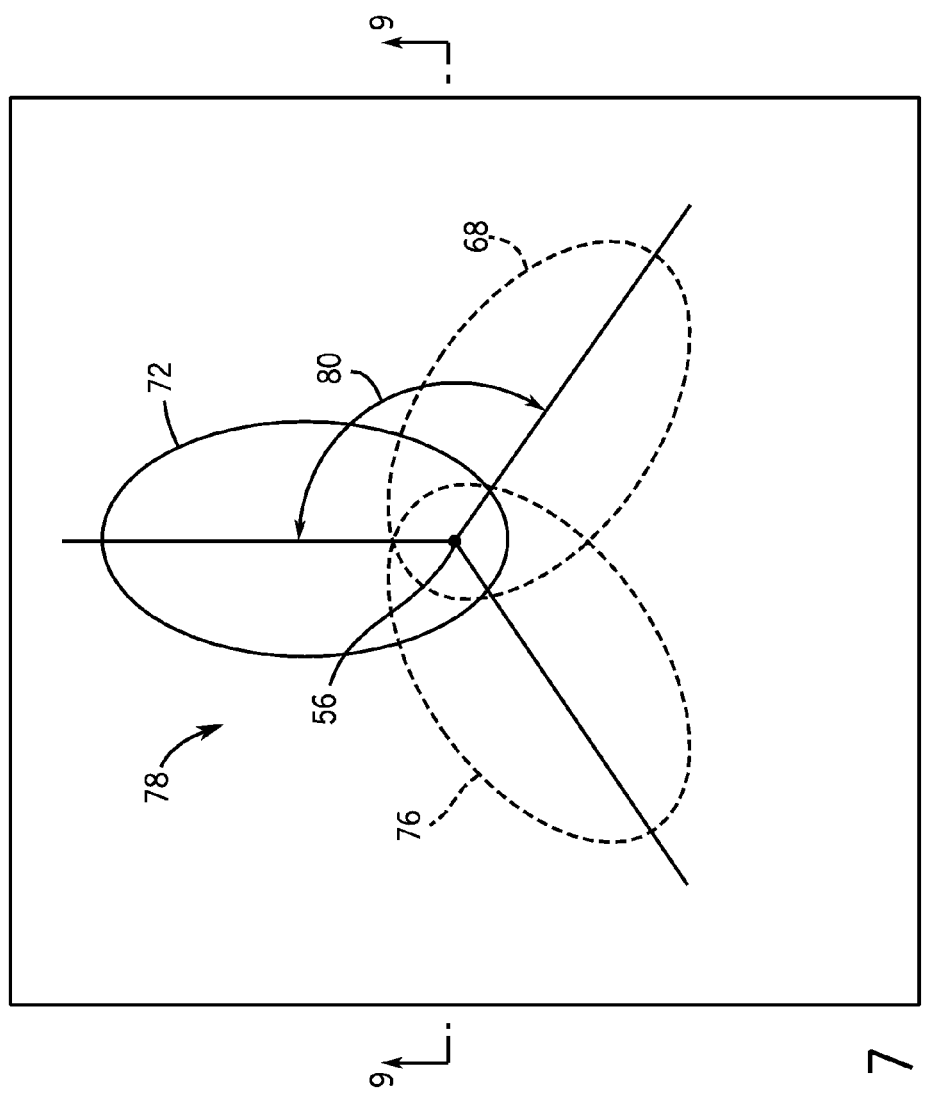
FIG. 7 is an illustration of the top view of a plurality of exemplary planar coils that are arranged to generate moment vectors in accordance with certain aspects of the present technique.
Figure 8:
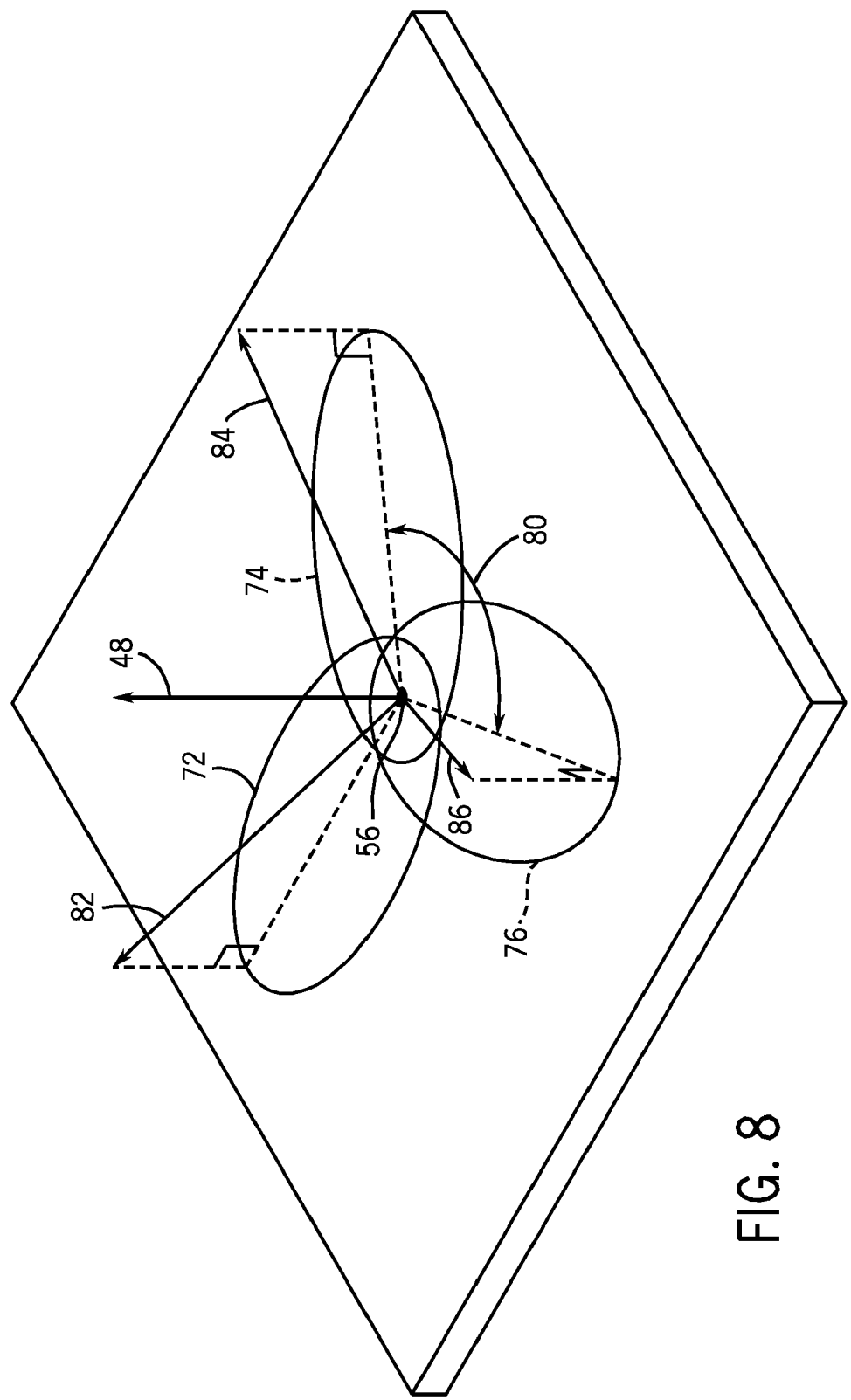
FIG. 8 is an illustration of a perspective view of a plurality of exemplary planar coils and the resulting moment vectors in accordance with certain aspects of the present technique.

In addition to providing a single titled moment vector 44, other embodiments may include a plurality of non-concentric planar coils 36 configured to provide a plurality of tilted moment vectors 44. For example, the embodiment of FIGS. 7 and 8 depict the layout of three planar coils 72, 74 and 76 that may form an approximately-orthogonal coil trio 78. In this embodiment, each of the three planar coils 72, 74 and 76 may be separated by a trio angle 80 about the origin 56. Each respective planar coil 72, 74 or 76 may generate a dipole moment vector 82, 84 or 86, as depicted in FIG. 8. In an embodiment wherein the three moment vectors 82, 84 and 86 are configured orthogonally, the trio angle 80 may be approximately 120 degrees. As will be appreciated by those of ordinary skill in the art, the number of planar coils 72, 74 and 76 may be varied, as well as varying the position, to generate a desired resulting magnetic field, or combination of magnetic fields. By providing multiple magnetic fields with varying moment vectors, tracking may be accomplished in multiple positions and orientations. For example, in one embodiment, it may be desirable to track at least one dipole receiver (e.g., the at least one complementary EM sensor 14 of FIG. 1) in three degrees of freedom (i.e., X, Y, Z position). To accomplish tracking in three degrees of freedom, three magnetic dipoles may be combined into a single EM sensor (such as one or more of EM sensors 22 or 24 of FIG. 1) wherein the dipole moment vectors are generally orthogonal (i.e., coil trio). The at least one complementary EM sensor 14 may then sense the individual magnetic field characteristics for processing of the three degrees of freedom. In another example, a tracking system wherein the both the EM sensors 22 and 24 and the at least one complementary EM sensor 14 are formed from coil trios, the at least one EM complementary sensor 14 may be tracked in six degrees of freedom to determine position and orientation, including the X, Y and Z coordinates as wells as the roll, pitch and yaw angles.

Figure 9:
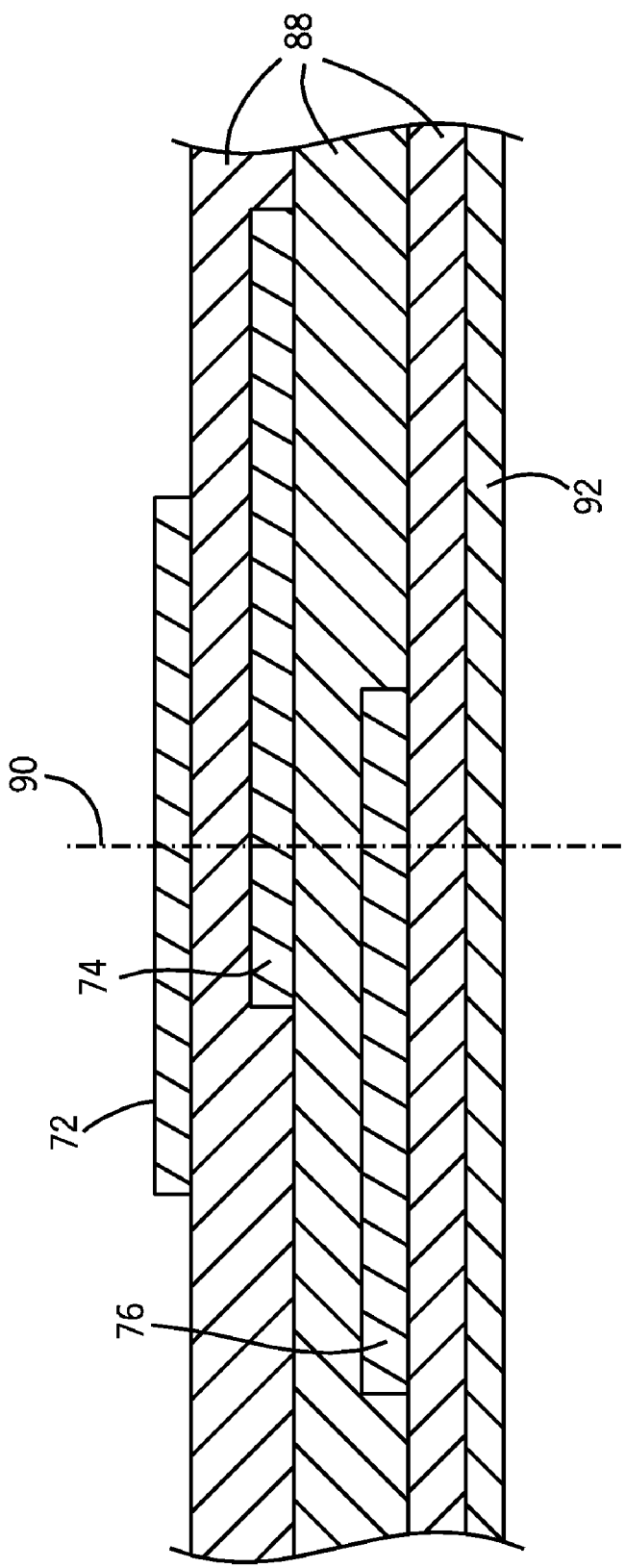
FIG. 9 is a cross sectional view of section 9-9 of FIG. 7, illustrating a multi-layer planar coil arrangement in accordance with certain aspects of the present technique.

Turning now to FIG. 9, an embodiment of a plurality of non-concentric planar coils 72, 74 and 76 is depicted in accordance with aspects of the present technique. As illustrated, an insulating layer 88 may be deposited between the each of the planar coils 72, 74 and 76. For example, FIG. 9 depicts the first second and third planar coils 72, 74 and 76 each deposited on, and electrically isolated by, three insulating layers 88. The planar coils 72, 74 and 76 may be located about a rotational axis 90 that runs orthogonal to the plane of the planar coils and through the origin 56 (see FIG. 8).

Further, an embodiment may include an electrically conductive layer 92 parallel to the plane of the insulating layers 88 and planar coils 72, 74 and 76. The electrically conductive layer 92 may prevent the magnetic field from entering the region below the electrically conductive layer 92, thereby reducing or eliminating distortions below that layer. For example, an electrically conductive layer 92 may be placed between the planar coils 72, 74 and 76 and a metal surgery table 34 (see FIG. 1) to prevent the magnetic field from extending below the surgery table 34. As discussed previously, limiting the volume of the magnetic field may be advantageous to decrease the region wherein distorting objects (such as table 34 and distorting objects 32) may affect the magnetic fields generated or sensed by the EM sensors 22 and 24 and/or the at least one complementary EM sensor 14. Therefore, the addition of the electrically conductive layer 92 below the coils of the EM sensors 22 and 24 may provide for magnetic fields with moment vectors 82, 84 and 86 (see FIG. 8) that are approximately orthogonal, and not subject to distortions from the volume below the electrically conductive layer 92. As will be appreciated by one of ordinary skill, the depicted configuration is not limited to an arrangement of three planar coils 72, 74 and 76, but may be varied to accommodate other arrangements. For example, the number of planar coils 72, 74 and 76 may be reduced, along with the respective insulating layers 88. In another embodiment, an additional insulating layer 88 may be deposited on the first planar coil 72, and an approximately-dipole coil 62 may be coupled to the insulating layer 88 (see FIG. 6). In one embodiment, the electrically conductive layer 92 may include an aluminum alloy. As will be appreciated by a person of ordinary skill in the art, the electrically conductive layer 92 may include other conductive materials.

In another embodiment, the coils 72, 74 and 76 may be formed on/in a flexible PCB made of flexible materials. For example, the PCB laminate comprising insulating layer 88, planar coils 72, 74, 76, and electrically conductive layer 92 are all made of flexible material, so that the low-profile planar sheet or flexible PCB may be rolled up for storage.

By using an EM coil arrangement 12 the present technique may benefit from several aspects including, for example: the sensor's low profile, the conductive layer 92 shielding from distortion, and the accuracy in processing due to the nature of the EM coil arrangement 12. As described below, the present technique may employ an arrangement of a plurality of EM sensors formed from the previously described planar coils, to more accurately resolve the position of the at least one complementary EM sensor 14.

Figure 10:
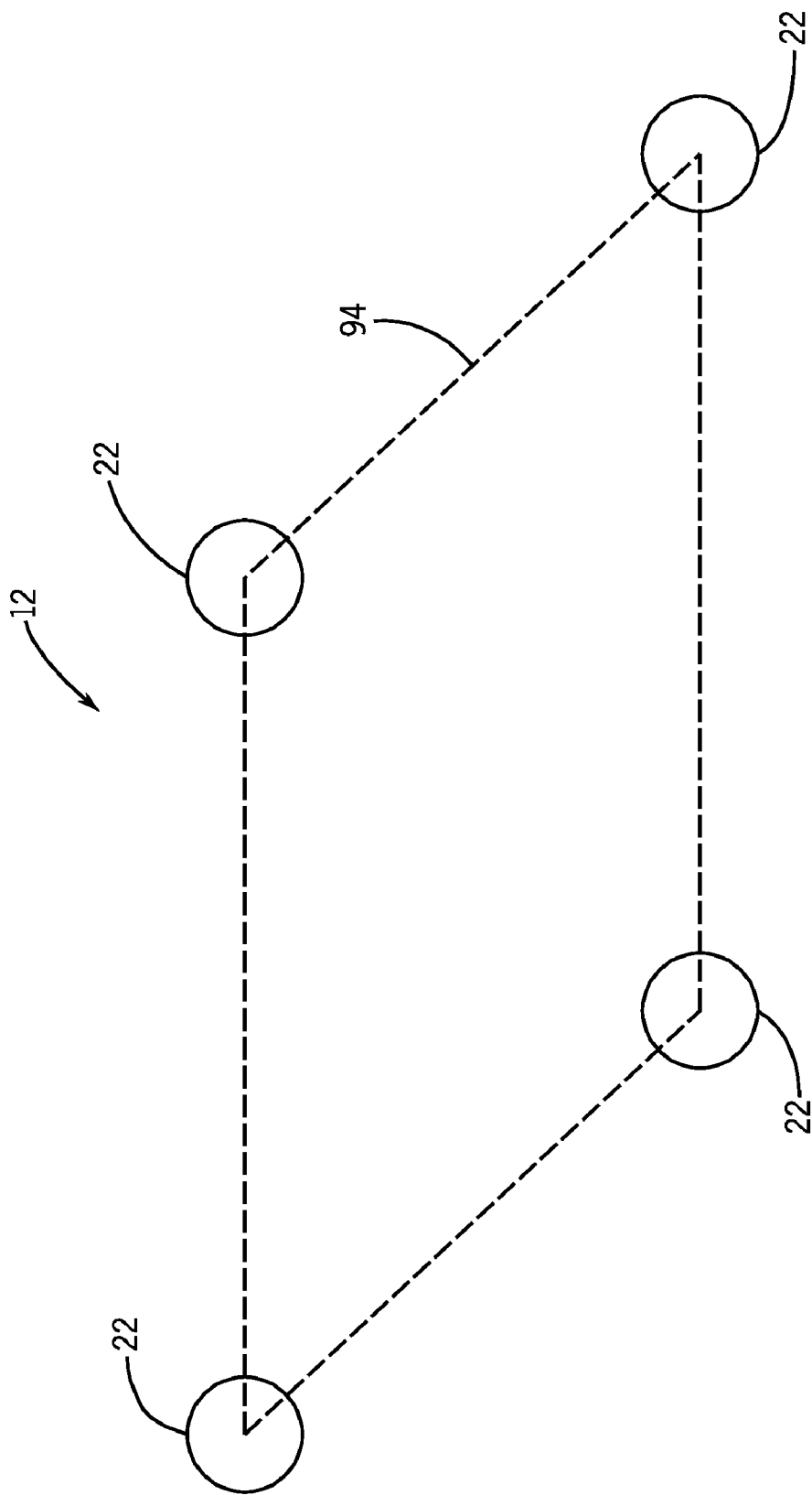
FIG. 10 is an illustration of an exemplary coil arrangement having a substantially quadrilateral configuration, in accordance with certain aspects of the present technique.

Turning now to FIG. 10, an EM coil arrangement 12 in accordance with an exemplary embodiment of the present technique is depicted. As depicted in FIG. 10, the EM coil arrangement 12 may include a plurality of EM sensors 22 arranged about the periphery of a region 94. In the illustrated embodiment, the EM sensors 22 are arranged about the periphery of the region 94 in a substantially quadrilateral configuration. As illustrated, one or more of the EM sensors 22 may be located at each of the vertices of the substantially quadrilateral configuration. Those of ordinary skill in the art will appreciate that positioning the EM sensors 22 near the vertices should also improve sensing accuracy.

Figure 11:
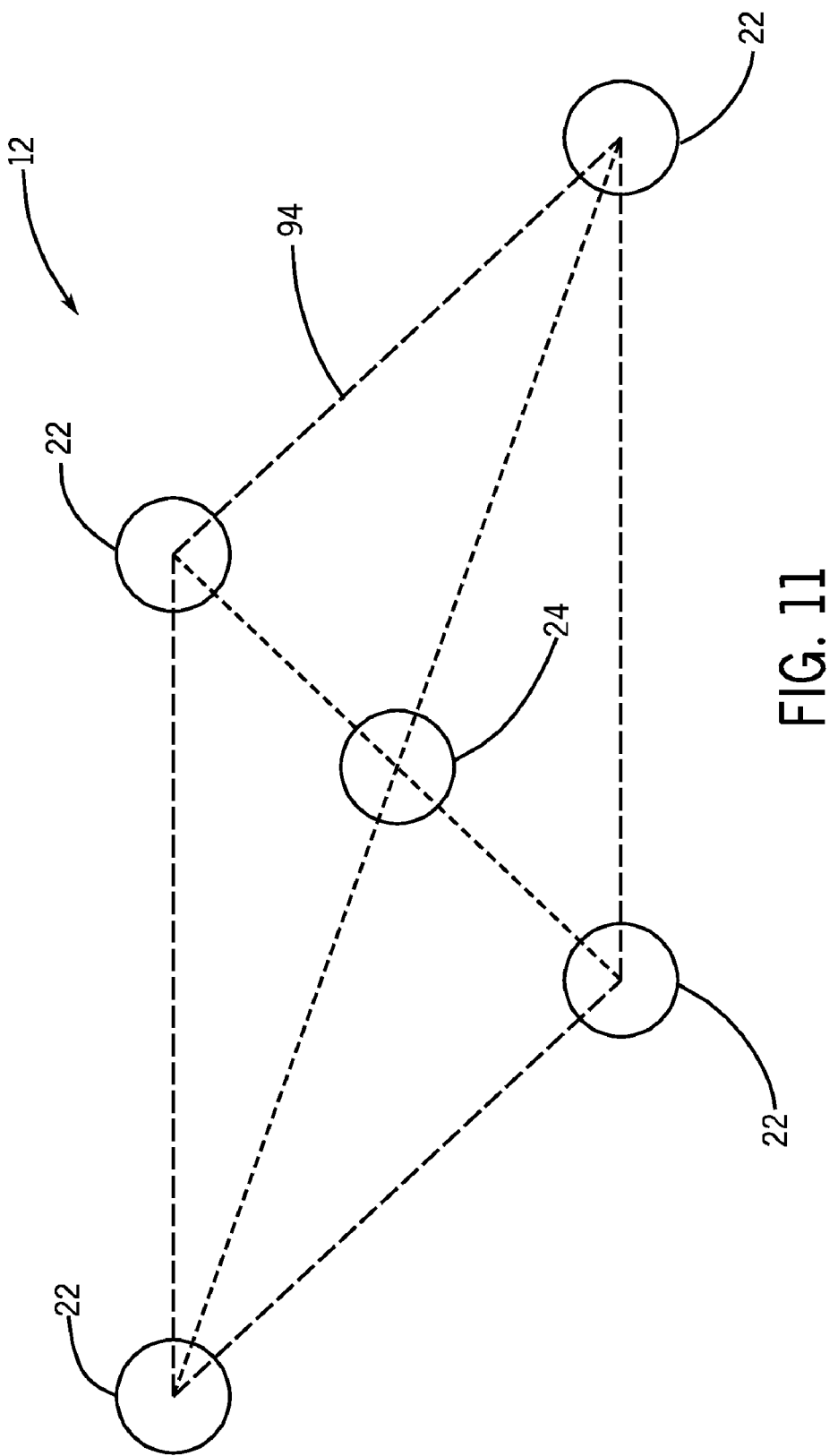
FIG. 11 is an illustration of an alternative exemplary coil arrangement having a substantially quadrilateral configuration and a sensor at or near the center of the substantially quadrilateral configuration, in accordance with certain aspects of the present technique.

Turning now to FIG. 11, an EM coil arrangement 12 in accordance with an exemplary embodiment of the present technique is depicted. In an embodiment, a plurality of EM sensors 22 may be arranged about the periphery of a region 94, with at least one center EM sensor 24 located in center of the region 94. The embodiment may include EM sensors 22 and the at least one center EM sensor 24 all being located in the same plane (e.g., on top of a surgery table or on the surface of a printed circuit board). For example, as depicted in FIG. 11, four EM sensors 22 may be located at the corners of a rectangular region 94, with at least one center EM sensor 24 located at the center of the region 94. While the at least one center EM sensor 24 is illustrated at the center of the region 94, those of ordinary skill in the art will appreciate that positioning the at least one center EM sensor 24 near the center, will also increase tracking accuracy.

In the embodiment illustrated by FIG. 11, the at least one center EM sensor 24 may provide for generation and sensing of an additional magnetic field. The sensed inductance of this magnetic field may be included in processing to provide an additional constraint to provide for more accurately determining the position and/or location of the at least one complementary EM sensor 14. This may be desirable, for example, where the at least one complementary EM sensor 14 approaches the plane where the EM sensors 22 and the center EM sensor 24 are located. As will be appreciated by those of ordinary skill in the art, the region 94 may vary in shape to accommodate various tracking areas. For example, the region 94 may be defined by a circular area, a polygon, or even a free form shape defined by the region it encompasses. As will also be appreciated by those of ordinary skill in the art, the number of EM sensors 22 and 24 may be varied to accommodate various applications. For example, eight EM sensors 24 may be positioned about the perimeter of a rectangular region, such as region 94 depicted in FIGS. 10 and 11. Further, in accordance with prior discussions, those of ordinary skill in the art will appreciate that the EM sensors 22 and the at least one center EM sensor 24 may each include single dipole coils, planar coils, a coil trio, or any combination thereof.

Figure 12:
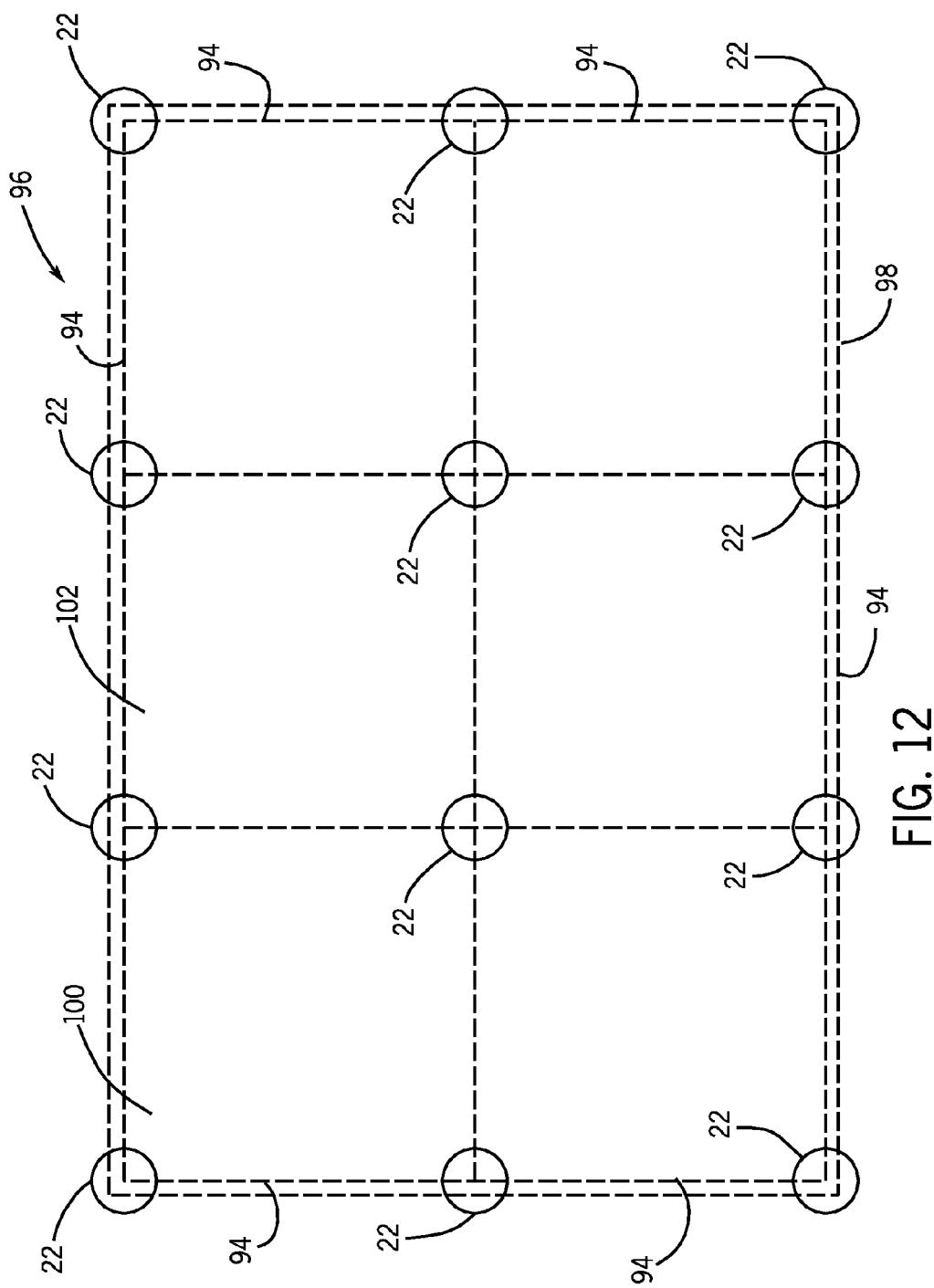
FIG. 12 is an illustration of an exemplary coil arrangement, wherein a plurality of sensors form a grid in accordance with certain aspects of the present technique.
Figure 13:
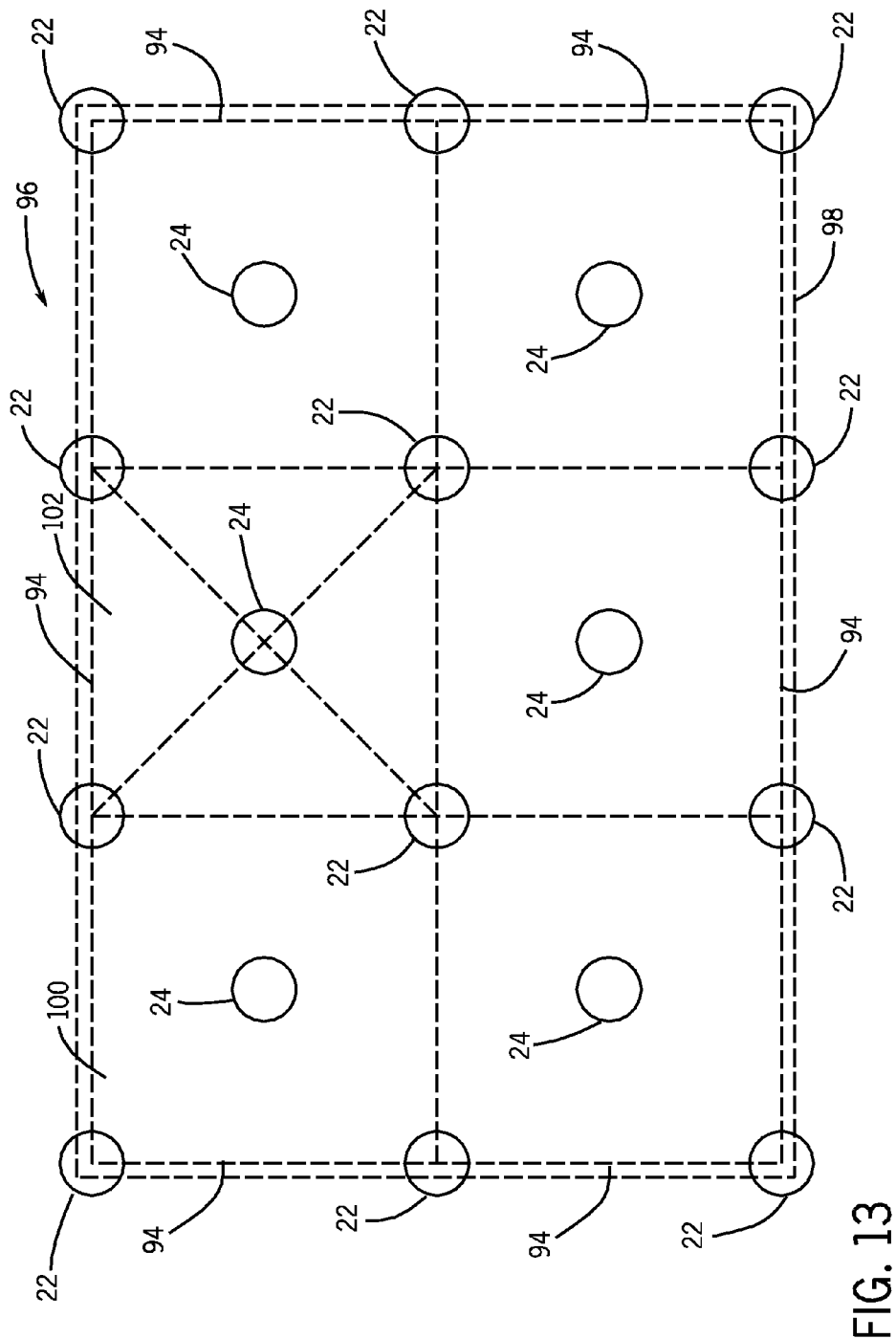
FIG. 13 is another illustration of an exemplary coil arrangement, wherein a plurality of sensors form a grid in accordance with certain aspects of the present technique.

To increase the area of the tracking volume accurately covered by the tracking arrangement depicted in FIG. 12, a plurality of EM coil arrangements 12 may be provided as an arranged array 96. In one embodiment, the arranged array 96 may include a plurality of EM coil arrangements 12 located in a single plane. For example, as depicted, six EM coil arrangements 12 may be located in a single array region 98. Similarly, an embodiment of an arranged array 96 may include at least one center EM sensor 24 as depicted in FIG. 13.

Figure 14:
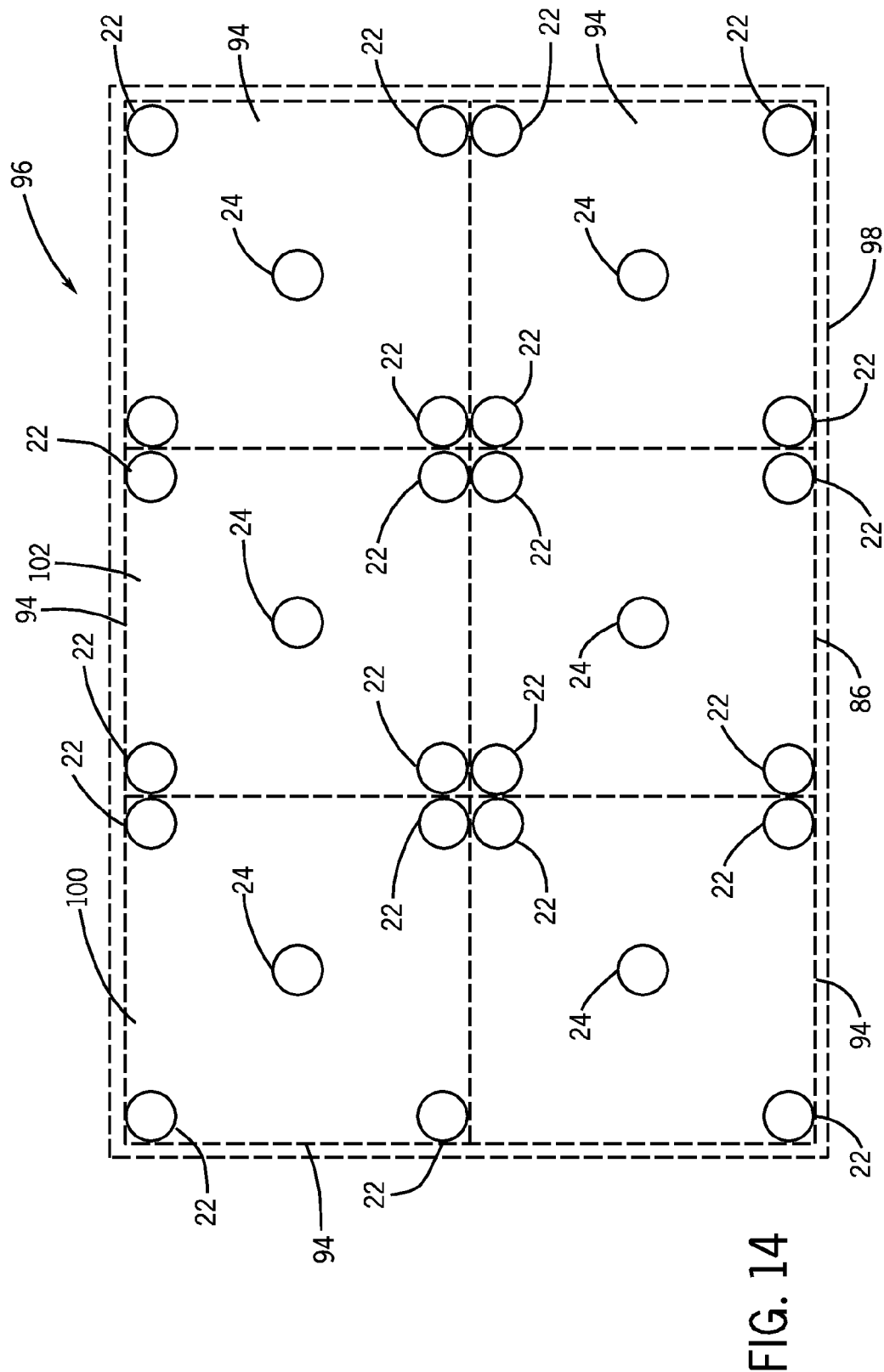
FIG. 14 is an illustration of an alternative configuration of a plurality of coil arrangements, in accordance with certain aspects of the present technique.

Further, an embodiment of an arranged array 96 may include two adjacent regions sharing two EM sensors 22 about their periphery. For example, as depicted in FIGS. 12 and 13, a first region 100 may be adjacent to a second region 102. In this embodiment, the first region 100 and the second region 102 may share two EM sensors 22 that adjoin the first region 100 and the second region 102. As will be appreciated by a person of ordinary skill in the art, the configuration of the arranged array 96 may by varied to accommodate specific applications. For example, it may be desirable for each of the arrangements 12 in the array region 98 to not share EM sensors 22. In an embodiment depicted by FIG. 14, although the regions 100 and 102 abut one another, each region may include its own set of four EM sensors 22. This may be advantageous for a tracking system 10 with EM coil arrangements 12 that are modular. For example, the arrangements 12 may include separable units that may be stacked side-by-side, or removed from to create an array region 98 of increased or decreased area. As will be appreciated by a person of ordinary skill in the art, the number of EM coil arrangements 12 in the arranged array 96, the shape of the regions 94, the shape and size of the arranged array region 98, and the configuration of the EM sensors 22 and 24 may be varied and/or combined to accommodate various applications. Note, the separation of the EM sensors 22 from regions 100 and 102 depicted with a center EM sensor 24 may also be provided in arranged arrays not containing a center EM sensor 24, as depicted in FIG. 12.

Figure 15:
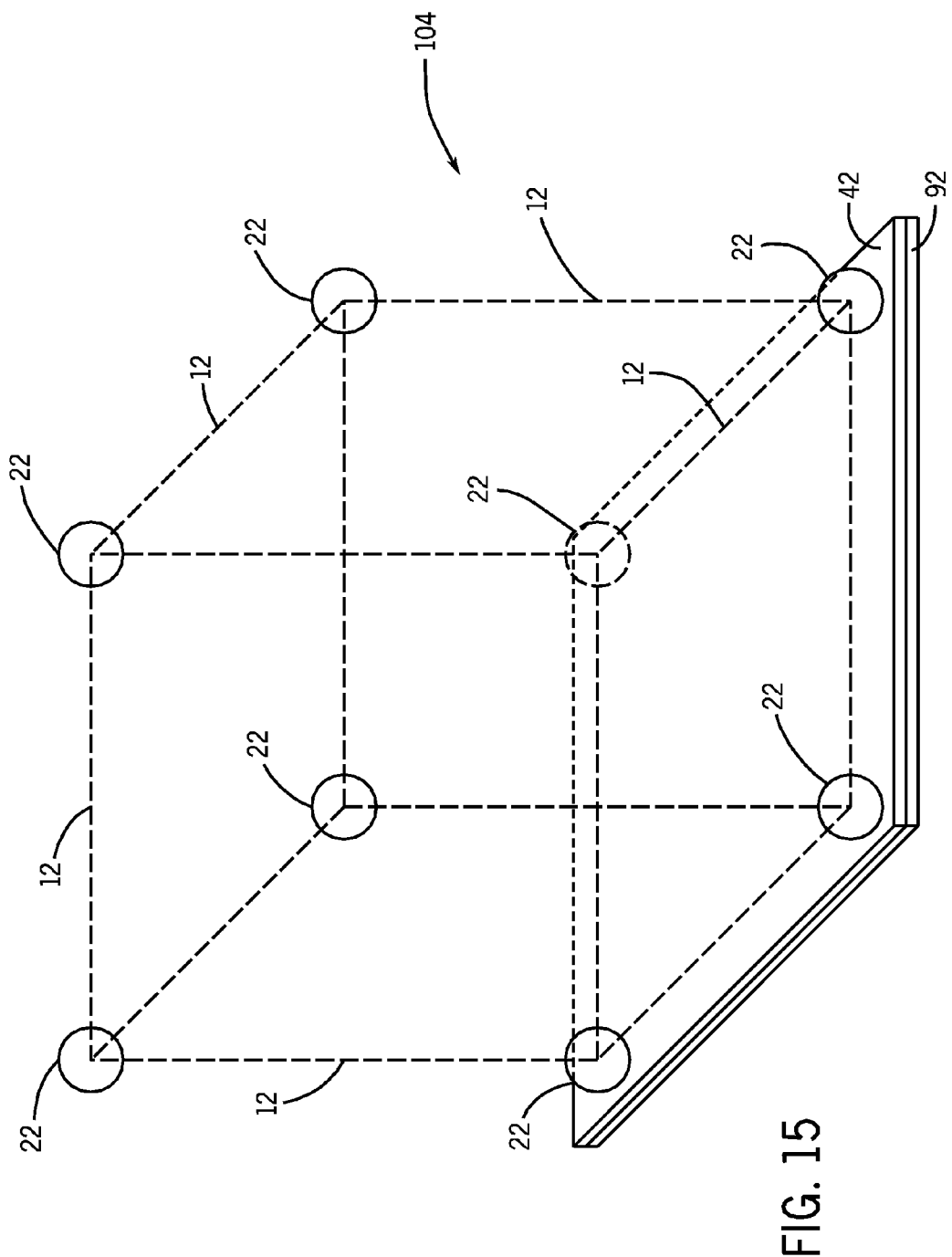
FIG. 15 is an illustration of an exemplary coil arrangement having a substantially hexahedron configuration, in accordance with certain aspects of the present technique.
Figure 16:
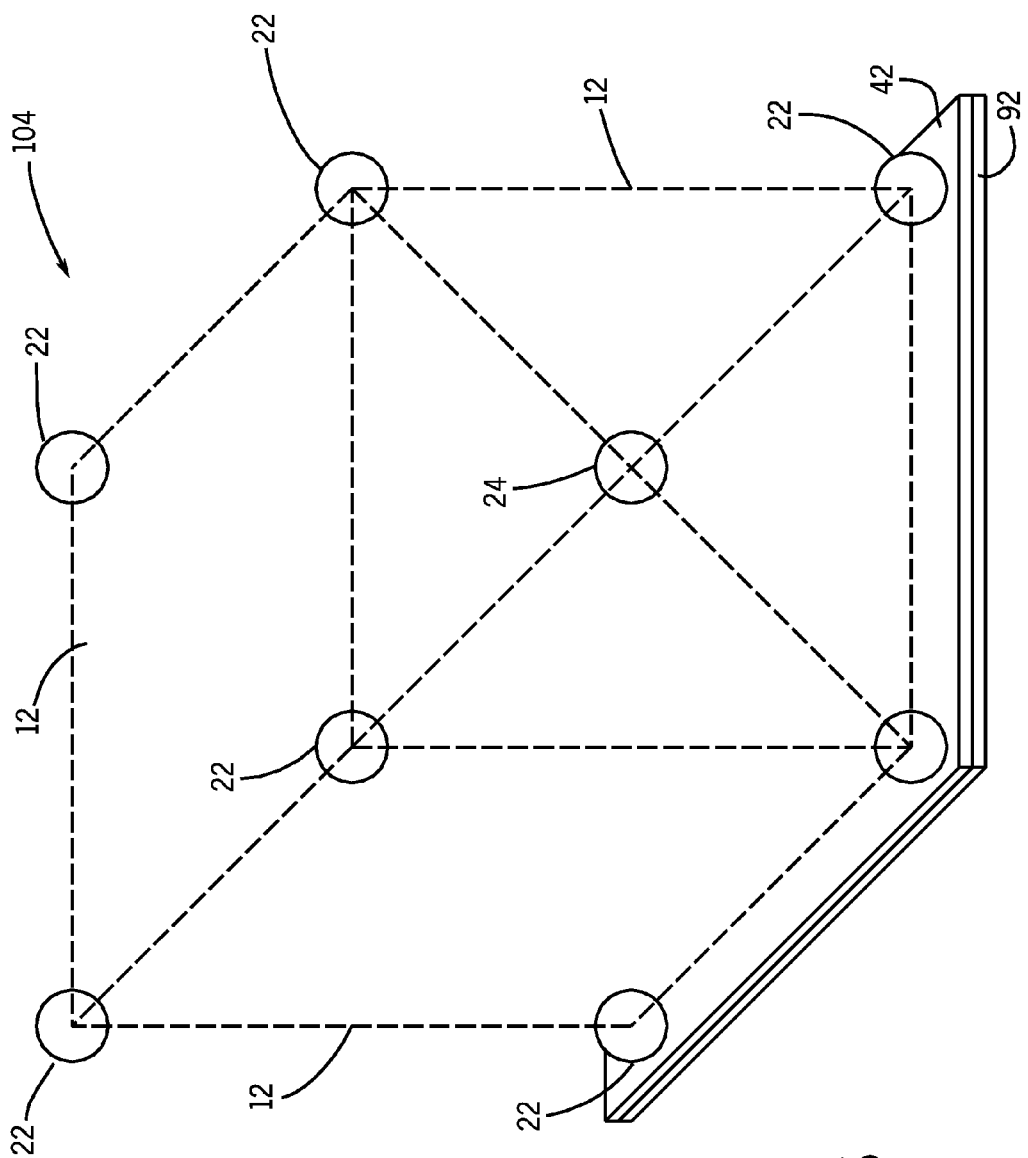
FIG. 16 is an illustration of an alternate exemplary coil arrangement having a substantially hexahedron configuration and having a sensor at or near the center of one face of the substantially hexahedron configuration, in accordance with certain aspects of the present technique.

Turning now to FIG. 15, depicted is a volume enclosed by multiple EM coil arrangements 12. In an embodiment, it may be desirable to enclose a volume with EM sensors 22 to provide tracking in or near an enclosed volume 104. For example, as depicted, the volume 104 may comprise faces forming a substantially hexahedron configuration. In such an alternate embodiment, at least one center EM sensor 24 may be located about the volume 104. For example, as depicted in FIG. 16, the EM coil arrangements 12 may be positioned about the faces of the volume 104 such that the EM sensors 22 are located about the periphery of the faces of the volume 104 and at least one center EM sensor 24 may be located at or near the center of at least one of the faces of the volume 104. This configuration may prove advantageous in similar situations as those described previously. For example, as the at least one complementary EM sensor 14 approaches the center region of a face of the volume 104, the system 10 may have difficulty processing the minute differences in mutual inductances used to estimate differences. As a result, the processor 16 may not accurately resolve a position of the at least one complementary EM sensor 14. The addition of at least one center EM sensor 24 on a face may increase the accuracy. As will be appreciated, not all of the faces on the volume 104 may include the at least one center EM sensor 24. For example, in one embodiment, it may be desirable to pass an object (i.e., a patient on a surgery room table) through one, or a multitude, of faces of the volume 104. In such an embodiment, it may be necessary to include an arrangement 12 with at least one center EM sensor 24 on the faces of the volume 104 where tracking near the face of the volume 104 may be desired, and no obstruction is present. Further, as will be appreciated by those ordinarily skilled in the art, in other embodiments the shape of the volume may take various forms. For example, the volume may include a substantially spherical shape that is enclosed by a multitude of EM coil arrangements 12, or other polyhedrons that may be enclosed by multiple EM coil arrangements 12.

Additionally, as illustrated by FIGS. 15 and 16, an embodiment may include at least one conductive layer 92 external to the volume. In the illustrated embodiment, the conductive layer 92 may be located opposite at least one face of the substantially hexahedron configuration from the volume 104. Similar to the above described embodiment, the conductive layer 92 may shield the volume 104 (such as the hexahedron) from distorting objects on the opposite the side of the conductive layer 92. As will be appreciated by those of ordinary skilled in the art, the configuration of the EM sensors 22 and 24 may be varied to provide for numerous tracking configurations. For example, the number of EM coil arrangements 12 (i.e., faces) including at least one center EM sensors 24 may be greater that one. Further, the conductive layer 92 may be positioned about any the faces of the substantially hexahedron configuration, both those including and not including the at least one center EM sensor 24. As will also be appreciated, the conductive layer 92 may be electrically isolated and coupled to the EM sensors 22 and 24 via a separate insulating layer 42 or substrate about the coils of the EM sensors 22 and 24.

Figure 17:
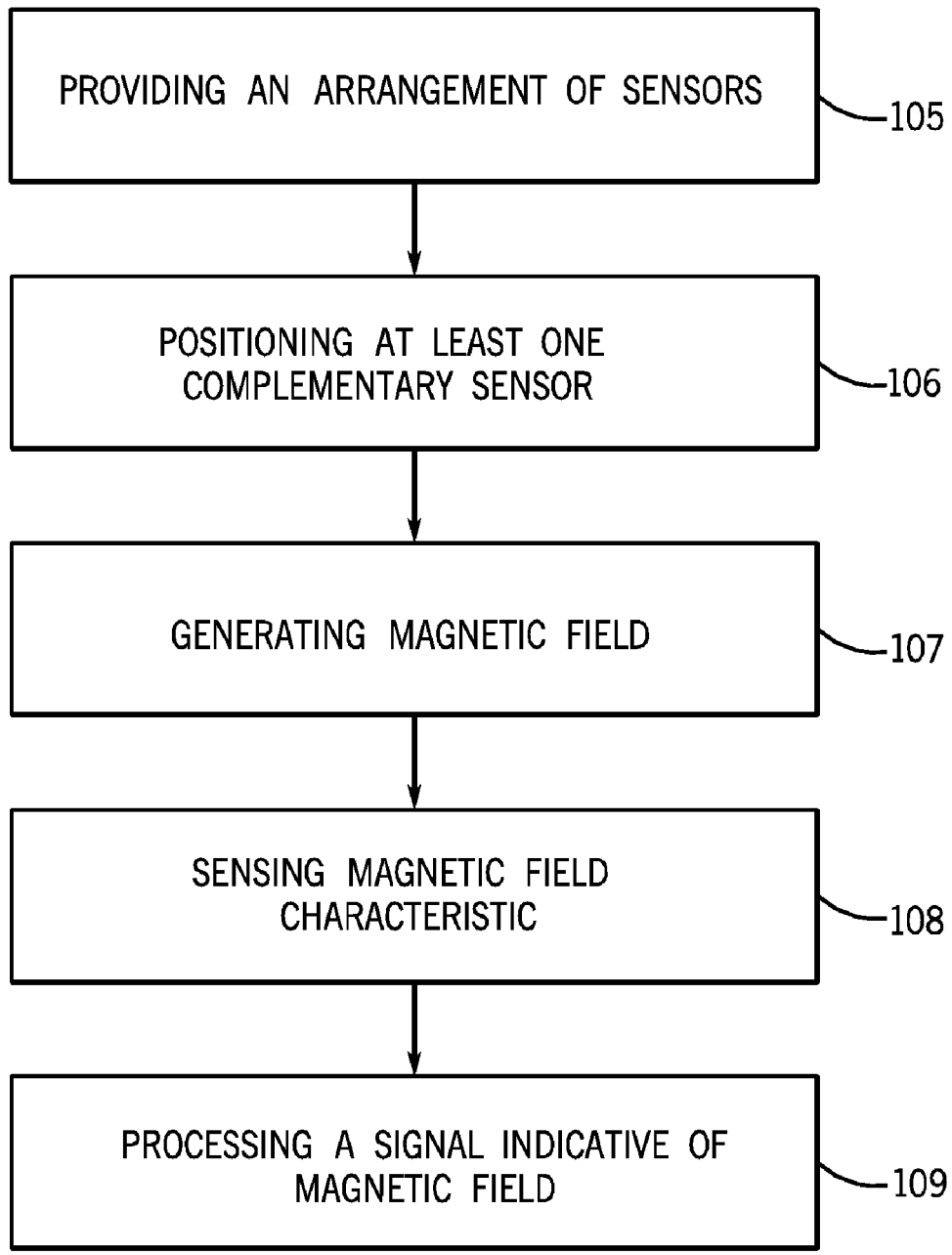
FIG. 17 is a flowchart depicting a method of electromagnetic tracking of the system of FIG. 1 in accordance with certain aspects of the present technique.

A method of implementing the EM tracking system 10 previously described is depicted in flowchart form in FIG. 17. As described above, an electromagnetic tracking system 10 may include an EM coil arrangement 12 and at least one complementary EM sensor 14. As previously mentioned, the EM coil arrangement 12 may comprise a plurality of EM sensors 22 located about the periphery of a region 94 and at least one center EM sensor 24 located at or near the region 94. In such an embodiment, either of the EM sensors 22, the at least one center EM sensor 24 or the at least one complementary EM sensor 14 may generate a magnetic field which is sensed by the other EM sensors. The sensed signal may be provided to a processor 16 to determine a parameter, such as position and/or orientation of the sensors 14, 22 and 24 relative to one another. Accordingly, FIG. 17 depicts the step of providing an arrangement of sensors at block 105. As will be appreciated by those of ordinary skill in the art, the EM coil arrangement 12 may be provided in various configurations, including those described previously. For example, the region 94, as well as the number of EM sensors 22 and 24 may be varied to meet the requirements of the system 10, such as fully covering the anticipated area of tracking. Additionally, the type of coils used to form the EM sensors 22 and 24 may include a single dipole coil, a planar coil, a coil trio, or a combination of the three.

As depicted at block 106, FIG. 17 further illustrates an embodiment which includes positioning the at least one complementary sensor 14. As described previously, the at least one complementary EM sensor 14 may be coupled to an instrument 20 tracked by the EM tracking system 10. Further, it should be noted different types of coils may be used to form the at least one complementary EM sensor 14. Coil types may include a single dipole coil, a planar coil, a coil trio, or a combination of the three, for example, as mentioned previously, the mutual inductance of EM sensors 22 and 24 and at least one complementary EM sensor 14 are the same, regardless as to which sensor is the receiver and which sensor is the transmitter. Accordingly, it will be appreciated by those of ordinary skill in the art that the steps of providing an arrangement of sensors (block 105) and positioning at least one complementary sensor (block 106), may be accomplished in any order, or configuration of sensors.

Returning to FIG. 17, an embodiment of the method further includes generating a magnetic field, as depicted at block 107. Embodiments of the method may include generating a single magnetic field, or generating a multitude of magnetic fields. For example, as discussed previously, the number of magnetic fields generated and detected may be increased in number to resolve an increased number of degrees of freedom, or may be increased to improve the accuracy of the system 10. Further, the method of generating a magnetic field may be provided by generation from the EM sensors 22 and 24 or the at least one complementary EM sensor 14.

Further, the method may also include sensing a magnetic field characteristic, as depicted at block 108. Magnetic field characteristics may include mutual inductance, phase, frequency, or the like. As will be appreciated by those ordinarily skilled in the art, the mutual inductance between EM sensors 22, the at least one center EM sensor 24 and/or the at least one complementary EM sensor 14, is the same no matter which one generates the magnetic field. Therefore, the discussions relating to the variation on generating magnetic fields also are consistent with sensing mutual inductance of the magnetic field (i.e., varying the number and type of EM sensors). Sensing mutual inductance of the magnetic field may also comprise providing a signal that is indicative of the detected mutual inductance, to a processor 16 for processing. For example, the at least one complementary EM sensor 14 may sense the mutual inductance of the magnetic field(s) generated by the EM sensors, and may convert the sensed characteristics to an electrical signal that is indicative of the sensed characteristics. In one embodiment, the electrical signal may include a modulated signal that is demodulated and processed by the processor 16.

FIG. 17 next illustrates processing a signal indicative of the magnetic field (block 109). For example, the embodiment of the method in FIG. 17 may include processing a signal indicative of the mutual inductance to determine a position and/or orientation of the sensors. Processing may include the processor 16 receiving data, including a signal indicative of the mutual inductance sensed, and performing several functions to arrive at a resolved position and/or orientation. In an electromagnetic tracking system 10, processing may take several different forms. For example, in one embodiment, the mutual inductance between each of the EM sensors 22 and 24 and at least one complementary EM sensor 14 may be equated to a distance. The distances may then be used to generate a "seed guess" of approximate position. This seed guess may then be used in processing of algorithms to determine a calculated electromagnetic field which is based on the known positions of the EM sensors 22 and 24 and the at least one complementary EM sensors 14 fixed about the tracking area. In one embodiment, processing may include the completion of several iterations of the measuring and comparing process until the sensed values are within a given range of error as compared to the calculated values. When the values approximately "match," the processor 16 may output the data as the resolved position and/or orientation. In another embodiment, processing to determine a position and/or orientation of the sensors may include processing the data for output to a user interface 18. For example, processing may include outputting the position data in the form of an image to a monitor. The image output may comprise the position resolved, represented by an icon overlaid on an image representing a patient.

Figure 18:
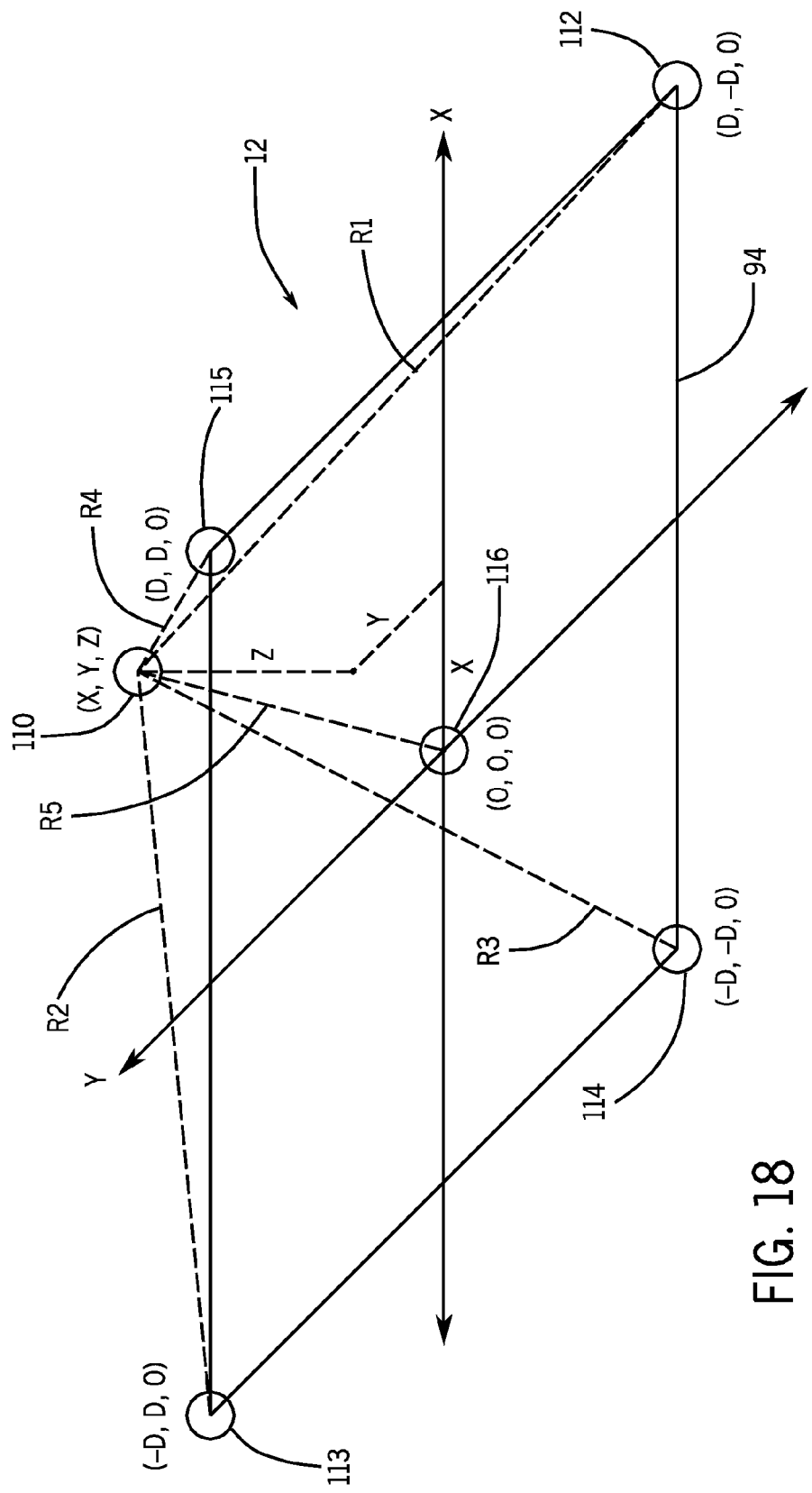
FIG. 18 is an illustration of the considerations for determining position of at least one complementary sensor in accordance with certain aspects of the present technique.

As mentioned previously, the EM coil arrangement 12 comprising EM sensors 22 about the periphery of a region 94 and at least one center EM sensor 24 may be beneficial, in certain exemplary embodiments, to allow processing to accurately resolve a position and/or orientation. For example, this may be demonstrated by a method used to equate the sensed mutual inductances to distances, and combine the distances in multiple dimensions to triangulate a position and/or orientation. As previously stated, processing (see block 109) may include, first, determining the position of at least one complementary EM sensor 14 to provide a seed guess for subsequent calculations. For example, as depicted in FIG. 18, one embodiment may include at least one complementary EM sensor 110, formed from a single dipole coil with a known effective area ($A_{effc}$). The at least one complementary EM sensor 110 may be positioned above a single plane containing an EM coil arrangement 12 of five EM sensors 112, 113, 114, 115 and 116, wherein each of the five EM sensors 112, 113, 114, 115 and 116 are formed from a coil trio with a known effective area ($A_{effe}$). The arrangement of five EM sensors 112, 113, 114, 115 and 116 may include four EM sensors 112, 113, 114 and 115 located at the corners of a square region 94, with at least one center EM sensor 116 located near the center of the square region 94. The positions in a three dimensional coordinate system may be defined as first EM sensor 112 located at (D,−D,0), second EM sensor 113 located at (−D, D,0), third EM sensor 114 located at (−D,−D,0), fourth EM sensor 115 located at (D,D,0), and the at least one center EM sensor 116 located at (0,0,0). The position of the at least one complementary EM sensor 110 may be defined as (x,y,z) above the square region. In this configuration, the distance from the at least one complementary EM sensor 110 to each EM sensor of the arrangement 12 may be defined as follows (see FIG. 18):

$R_1$=distance from first EM sensor 112 to at least one complementary EM sensor 110;
$R_2$=distance from second EM sensor 113 to at least one complementary EM sensor 110;
$R_3$=distance from third EM sensor 114 to at least one complementary EM sensor 110;
$R_4$=distance from forth EM sensor 115 to at least one complementary EM sensor 110; and
$R_5$=distance from at least one center EM sensor 116 to at least one complementary EM sensor 110.

The mutual inductance between the at least one complementary EM sensor 110 and one of the EM sensors 112, 113, 114, 115 and 116 of the EM coil arrangement 12 may be given by:

$$L = \frac{\mu_o \times A_{effc} \times A_{effe}}{R^3} \times C_1 \quad (1)$$

Wherein:
L=mutual inductance magnitude in henries;
$\mu_o$=the permeability of free space=$\Pi * 4 \times 10^{-7}$ henries/meter;
R=distance between sensors; and
$C_1$=a factor between 1 and 2 that may be determined based upon the orientation of the generating sensor.

Wherein $C_1$ is equal to the square root of two, equation 1 may be approximated:

$$L = \frac{\mu_o \times A_{effc} \times A_{effe}}{R^3} \times \sqrt{2} \quad (2)$$

Solving equation 2 for the distance R gives:

$$R = \sqrt[3]{\frac{\mu_o \times A_{effc} \times A_{effe} \times \sqrt{2}}{L}} \quad (3)$$

Using equation 3 and the mutual-inductance sensed from each respective sensor, the approximate distances, $R_1, R_2, R_3, R_4,$ and $R_5$ may be calculated. By triangulation of the distances, it may determined:

$$x = \frac{R_2^2 - R_4^2 + R_3^2 - R_1^2}{8D} \quad (4)$$

$$y = \frac{R_1^2 - R_4^2 + R_3^2 - R_2^2}{8D} \quad (5)$$

At this point in the processing, the benefit of the at least one center EM sensor 116 may become evident. For example, if only four sensors are used at the corners of the rectangular region 94 and $R_5$ is not known, a square root is needed to calculate the z component of the at least one complementary EM sensor 110 location:

$$z = \sqrt{\frac{R_4^2 + R_1^2 + R_3^2 + R_2^2 - 4x^2 - 4y^2}{4}} \quad (6)$$

As the actual position of the at least one complementary EM sensor 110 approaches the plane that includes the four EM sensors 112, 113, 114, and 115 equation 6 may produce inaccurate z position determinations. In addition, the inaccuracy may include incomprehensible imaginary results if the numerator of equation 6 is negative and therefore results in the square root of a negative number.

To improve the accuracy of the position determination in the z axis, the addition of the at least one center EM sensor 116 may provide for accurate and reliable results. For example, the addition of the at least one center EM sensor 116 may provide for the following direct calculation of distance based on the at least one center EM sensor 116:

$$z = \sqrt{\frac{R_5^2 - x^2 - y^2}{4}} \quad (7)$$

Under equation 7, if solving for z results in an imaginary number the value for z may be set to zero.

As described previously, the processor 16 may implement the above technique to determine an approximate position for the at least one complementary EM sensor 110 which is being tracked by the system 10. This initial position estimate (i.e., "seed guess") may be used as the determined position or in subsequent algorithms to more accurately determine the position and/or orientation of the at least one complementary EM sensor 110.

While only certain features have been illustrated and described herein, many modifications and changes will occur to those skilled in the art. It is, therefore, to be understood that the appended claims are intended to cover all such modifications and changes.

The invention claimed is:

1. An electromagnetic coil arrangement comprising:
a set of electromagnetic sensors at fixed locations with respect to each other, each of the electromagnetic sensors comprising a planar coil coupled to a conductive layer, the planar coil comprising non-concentric rings, wherein at least one of the electromagnetic sensors comprises second non-concentric rings and third non-concentric rings such that the non-concentric rings, the second non-concentric rings, and the third non-concentric rings are configured to form a coil trio.

2. The electromagnetic coil arrangement of claim 1, wherein each planar coil is configured such that a drive current applied across the non-concentric rings of the respective planar coil provides a magnetic field, the magnetic field comprising a moment vector that is tilted at an angle from normal to the respective planar coil.

3. The electromagnetic coil arrangement of claim 1, wherein the coil trio is configured to generate three magnetic fields having dipole moment vectors that are generally orthogonal relative to each other.

4. The electromagnetic coil arrangement of claim 1, wherein the set of electromagnetic sensors are arranged about a volume in a substantially hexahedron configuration.

5. The electromagnetic coil arrangement of claim 4, wherein the set of electromagnetic sensors comprises at least one center electromagnetic sensor located at or near the center of at least one face of the substantially hexahedron configuration.

6. The electromagnetic coil arrangement of claim 1, wherein the set of electromagnetic sensors comprises a plurality of electromagnetic sensors located about the periphery of a region.

7. The electromagnetic coil arrangement of claim 6, wherein the set of the electromagnetic sensors comprises a center electromagnetic sensor located at or near the center of the region.

8. The electromagnetic coil arrangement of claim 6, wherein the electromagnetic sensors are arranged about the periphery of the region in a substantially quadrilateral configuration located in a single plane.

9. An electromagnetic coil arrangement comprising:
a set of electromagnetic sensors at fixed locations with respect to each other, each of the electromagnetic sensors comprising a planar coil coupled to a conductive layer, the planar coil comprising non-concentric rings, wherein the set of the electromagnetic sensors comprises a plurality of substantially quadrilateral sensor configurations that are configured to form a grid of electromagnetic sensors located in a single plane.

10. The electromagnetic sensor arrangement of claim 1, wherein the conductive layer is coupled to the planar coil via an insulating substrate.

* * * * *